United States Patent
Nakamura et al.

(10) Patent No.: US 10,824,121 B2
(45) Date of Patent: Nov. 3, 2020

(54) MACHINE LEARNING DEVICE, SERVO MOTOR CONTROLLER, SERVO MOTOR CONTROL SYSTEM, AND MACHINE LEARNING METHOD

(71) Applicant: FANUC CORPORATION, Minamitsuru-gun, Yamanashi (JP)

(72) Inventors: Tsutomu Nakamura, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 172 days.

(21) Appl. No.: 16/243,657

(22) Filed: Jan. 9, 2019

(65) Prior Publication Data
US 2019/0227502 A1 Jul. 25, 2019

(30) Foreign Application Priority Data
Jan. 25, 2018 (JP) ................................. 2018-010676

(51) Int. Cl.
*G06N 20/00* (2019.01)
*G05B 13/02* (2006.01)

(52) U.S. Cl.
CPC ......... *G05B 13/0265* (2013.01); *G06N 20/00* (2019.01)

(58) Field of Classification Search
CPC ................................................ G05B 13/0265
See application file for complete search history.

(56) References Cited

FOREIGN PATENT DOCUMENTS

| JP | 2008-225533 | 9/2008 |
|----|-------------|--------|
| JP | 2009-106034 | 5/2009 |
| JP | 2015-156194 | 8/2015 |
| JP | 2016-190305 | 11/2016 |
| JP | 2017-34844 | 2/2017 |
| JP | 2017-70105 | 4/2017 |
| JP | 2017-71011 | 4/2017 |

(Continued)

OTHER PUBLICATIONS

Barto, Andrew G.; Reinforcement Learning in Motor Control; 2003; pp. 1-9. (Year: 2003).*

(Continued)

*Primary Examiner* — Stanley K. Hill
(74) *Attorney, Agent, or Firm* — Wenderoth, Lind & Ponack, L.L.P.

(57) ABSTRACT

A machine learning device that performs machine learning with respect to a changing unit configured to change a parameter of a control unit configured to control a servo motor and a compensation value of at least one of a position command and a torque command includes: a state information acquisition unit configured to acquire state information including the position command, a positional error, a combination of the parameter and the compensation value; an action information output unit configured to output action information including adjustment information of the combination of the parameter and the compensation value included in the state information; a reward output unit configured to output a reward value of reinforcement learning based on the positional error included in the state information; and a value function updating unit configured to update a value function based on the value of the reward, the state information, and the action information.

8 Claims, 11 Drawing Sheets

(56) References Cited

FOREIGN PATENT DOCUMENTS

JP      2017-102613     6/2017
WO      2012/057219     5/2012

OTHER PUBLICATIONS

Chen, Pengzhan et al.; Control Strategy of Speed Servo Systems Based on Deep Reinforcement Learning; Algorithms 2018, 11, 65 ; doi:10.3390/a11050065; pp. 1-18. (Year: 2018).*
Gyback, Gustav et al.; Real-time System Control with Deep Reinforcement Learning; C5A System Control With DDPG; 2018; 6 pages (Year: 2018).*
Stray, Tharald Jorgen; Application of deep reinforcement learning for control problems; 2019; Master's thesis in Cybernetics and Robotics; Norwegian University of Science and Technology; 81 pages (Year: 2019).*
Bingran, Li et al.; Trajectory smoothing method using reinforcement learning for computer numerical control machine tools; Elsevier; Robotics and Computer Integrated Manufacturing 61 (2020) 101847; pp. 1-12. (Year: 2020).*
Notification of Reasons for Refusal dated Dec. 3, 2019 in Japanese Patent Application No. 2018-010676.

* cited by examiner

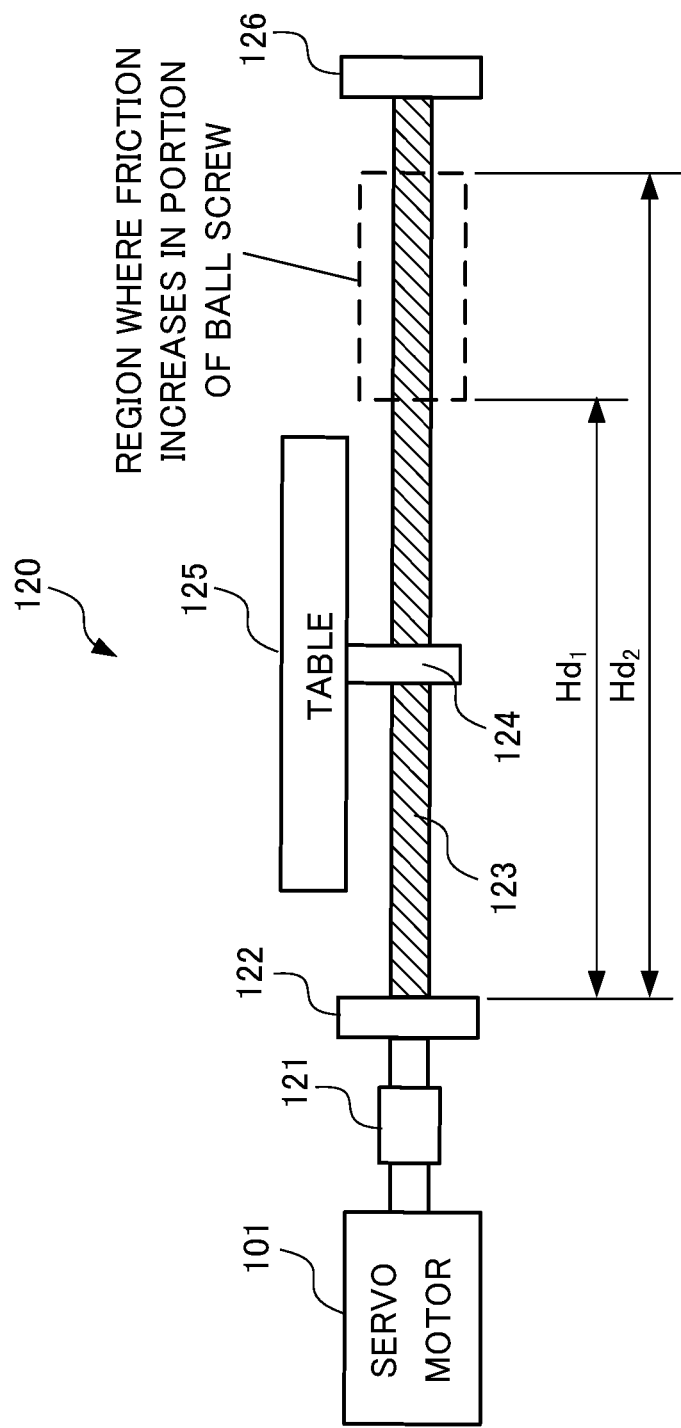

MACHINE LEARNING DEVICE, SERVO MOTOR CONTROLLER, SERVO MOTOR CONTROL SYSTEM, AND MACHINE LEARNING METHOD

This application is based on and claims the benefit of priority from Japanese Patent Application No. 2018-010676, filed on 25 Jan. 2018, the content of which is incorporated herein by reference.

BACKGROUND OF THE INVENTION

Field of the Invention

The present invention relates to a machine learning device that performs learning related to parameters and compensation values with respect to a servo motor controller that changes the parameters of a control unit that controls a servo motor and at least one of a position command and a torque command with respect to a variation in load applied to a control target, a servo motor controller and a servo motor control system including the machine learning device, and a machine learning method.

Related Art

As examples of a conventional servo motor controller, a numerical controller disclosed in Patent Document 1, a machine controller disclosed in Patent Document 2, a motor controller disclosed in Patent Document 3, and a servo controller disclosed in Patent Document 4 are known.

The numerical controller disclosed in Patent Document 1 divides a movable range of a feed shaft of a machine tool into a plurality of regions and stores a plurality of control programs corresponding to the plurality of divided regions in advance. The numerical controller detects the position of the feed shaft during machining of a work, reads a control parameter corresponding to a divided region to which the detected position of the feed shaft during machining of a work belongs from the plurality of stored control parameters, and controls the feed shaft using the read control parameter. Moreover, the numerical controller adds an output from a torque feedforward control unit and an output of a velocity feedback control unit and supplies the addition value to a feed shaft motor driving unit via a band elimination filter to thereby drive a feed shaft motor.

The machine controller disclosed in Patent Document 2 estimates a frictional force generated in a machine on the basis of a velocity output from the machine, multiplies the estimated frictional force with a proportional gain to obtain a friction compensation value, and corrects a torque command using the obtained friction compensation value. The proportional gain is determined on the basis of a gain characteristic of a transfer function from a position command for the machine to a positional error.

The motor controller disclosed in Patent Document 3 includes a first learning controller that calculates a positional error compensation amount so that a positional error of a first motor is minimized and a second learning controller that calculates a positional error compensation amount so that a positional error of a second motor is minimized. The motor controller equalizes the responsiveness of respective motors by equalizing the parameters that determine responsiveness of learning control.

The servo controller disclosed in Patent Document 4 controls a master-side driving source that drives a driving shaft and a slave-side driving source that drives a driven shaft in a synchronized manner. The servo controller obtains a synchronization error which is a difference between a positional error of the master-side driving source and a positional error of the slave-side driving source on the basis of a position command value for the slave-side driving source so as to decrease the synchronization error. The learning controller receives the synchronization error and calculates compensation data for correcting the positional error of the feed-side servo motor on the basis of the synchronization error.

Patent Document 1: PCT International Publication No. WO2012/057219
Patent Document 2: Japanese Unexamined Patent Application, Publication No. 2015-156194
Patent Document 3: Japanese Unexamined Patent Application, Publication No. 2009-106034
Patent Document 4: Japanese Unexamined Patent Application, Publication No. 2008-225533

SUMMARY OF THE INVENTION

The load applied to a control target controlled by the servo motor controller may vary depending on an angle of a control target rotation shaft or the position or the like of a control target driver. With regard to this variation in load, changing the parameters of a control unit that controls the servo motor and the compensation value of at least one of the position command and the torque command is important in improving the servo performance. When the parameters of the control unit and the compensation value are changed to cope with a variation in the load applied to the control target, it is an issue how to set the parameter value of the control unit and the compensation value according to the angle of the control target rotation shaft and the position of the control target driver. An object of the present invention is to provide a machine learning device, a servo motor controller, a servo motor control system, and a machine learning method capable of setting a parameter value of a control unit of a servo motor controller and a compensation value of at least one of a position command and a torque command to appropriate values according to a variation in the load applied to a control target to improve the servo performance.

(1) A machine learning device (for example, a machine learning device 300 to be described later) according to the present invention is a machine learning device that performs machine learning with respect to a servo motor controller (for example, a servo motor controller 200 to be described later) including a changing unit (for example, a changing unit 206 to be described later) configured to change a parameter of a control unit (for example, a control unit 204 to be described later) configured to control a servo motor (for example, a servo motor 101 to be described later) on the basis of a position command and a compensation value of at least one of the position command and a torque command, the machine learning device including:

a state information acquisition unit (for example, a state information acquisition unit 301 to be described later) configured to acquire, from the servo motor controller, state information including the position command, a servo state including at least a positional error, a combination of the parameter of the control unit and the compensation value by causing the servo motor controller to execute a predetermined program;

an action information output unit (for example, an action information output unit 303 to be described later) configured to output action information including adjustment information of the combination of the parameter and the compensation value included in the state information, to the servo motor controller;

a reward output unit (for example, a reward output unit 3021 to be described later) configured to output a value of a reward of reinforcement learning based on the positional error included in the state information; and a value function updating unit (for example, a value function updating unit 3022 to be described later) configured to update a value function on the basis of the value of the reward output by the reward output unit, the state information, and the action information.

(2) In the machine learning device according to (1), the reward output unit may output the value of the reward on the basis of an absolute value of the positional error.

(3) The machine learning device according to (1) or (2) may further include an optimization action information output unit (for example, an optimization action information output unit 305 to be described later) configured to generate a combination of the parameter of the control unit and the compensation value of at least one of the position command and the torque command on the basis of the value function updated by the value function updating unit, and configured to output the combination to the changing unit.

(4) A servo motor control system (for example, a servo motor control system 10 to be described later) according to the present invention is a servo motor control system including: the machine learning device (for example, a machine learning device 300 to be described later) according to any one of (1) to (3); a servo motor controller (for example, a servo motor controller 200 to be described later) including a changing unit (for example, a changing unit 206 to be described later) configured to change a parameter of a control unit (for example, a control unit 204 to be described later) configured to control a servo motor on the basis of a position command and a compensation value of at least one of the position command and a torque command; and a control target (for example, a control target 100, 110, 120 to be described later) controlled by the servo motor controller.

(5) In the servo motor control system according to (4), the control target (for example, a control target 100 to be described later) may include a servo motor and a driver (for example, a tilt mechanism 104 to be described later) of which the rotation angle is controlled by the servo motor, and a load that a rotation shaft of the driver varies depending on the rotation angle.

(6) In the servo motor control system according to (4), the control target (for example, a control target 110, 120 to be described later) may include a servo motor and a driver (for example, a spindle head 113 or a nut 124 to be described later) of which the position is controlled by the servo motor, and a load that the control target receives may vary depending on the position.

(7) In the servo motor control system according to (5) or (6), the load may change with time.

(8) In the servo motor control system according to any one of (4) to (7), the control unit of the servo motor controller may include: a position control unit (for example, a position control unit 2041 to be described later) configured to generate a velocity command on the basis of the position command; a velocity control unit (for example, a velocity control unit 2043 to be described later) configured to generate the torque command on the basis of the velocity command output from the position control unit; and a filter (for example, a filter 2044 to be described later) configured to attenuate signals of frequencies in a predetermined frequency range of the torque command output from the velocity control unit, and the changing unit may change a gain of at least one of the position control unit and the velocity control unit, a filter coefficient of the filter, and at least one of a torque offset value and a friction compensation value applied to the position command or the torque command, on the basis of the action information.

(9) A servo motor controller (for example, a servo motor controller 200 to be described later) according to the present invention is a servo motor controller including: the machine learning device (for example, a machine learning device 300 to be described later) according to any one of (1) to (3); and a changing unit (for example, a changing unit 206 to be described later) configured to change a parameter of a control unit (for example, a control unit 204 to be described later) configured to control a servo motor on the basis of a position command and a compensation value of at least one of the position command and a torque command, on the basis of the action information from the machine learning device.

(10) A machine learning method according to the present invention is a machine learning method of a machine learning device (for example, a machine learning device 300 to be described later) that performs machine learning with respect to a servo motor controller (for example, a servo motor controller 200 to be described later) including a changing unit (for example, a changing unit 206 to be described later) configured to change a parameter of a control unit (for example, a control unit 204 to be described later) configured to control a servo motor on the basis of a position command and a compensation value of at least one of the position command and a torque command, the machine learning method including:

acquiring, from the servo motor controller, state information including the position command, a servo state including at least a positional error, a combination of the parameter of the control unit and the compensation value, by causing the servo motor controller to execute a predetermined program;

outputting action information including adjustment information of the combination of the parameter and the compensation value included in the state information; and updating a value function on the basis of a value of a reward of reinforcement learning based on the positional error included in the state information, the state information, and the action information.

According to the present invention, it is possible to set a parameter value of a control unit of a servo motor controller and a compensation value of at least one of a position command and a torque command to appropriate values according to a variation in the load applied to a control target to improve the servo performance.

BRIEF DESCRIPTION OF THE DRAWINGS

FIG. 12 is a block diagram illustrating a machine tool including a servo motor, serving as a control target of a servo motor control system according to a third embodiment of the present invention.

DETAILED DESCRIPTION OF THE INVENTION

Hereinafter, embodiments of the present invention will be described in detail with reference to the drawings.

First Embodiment

Figure 1:
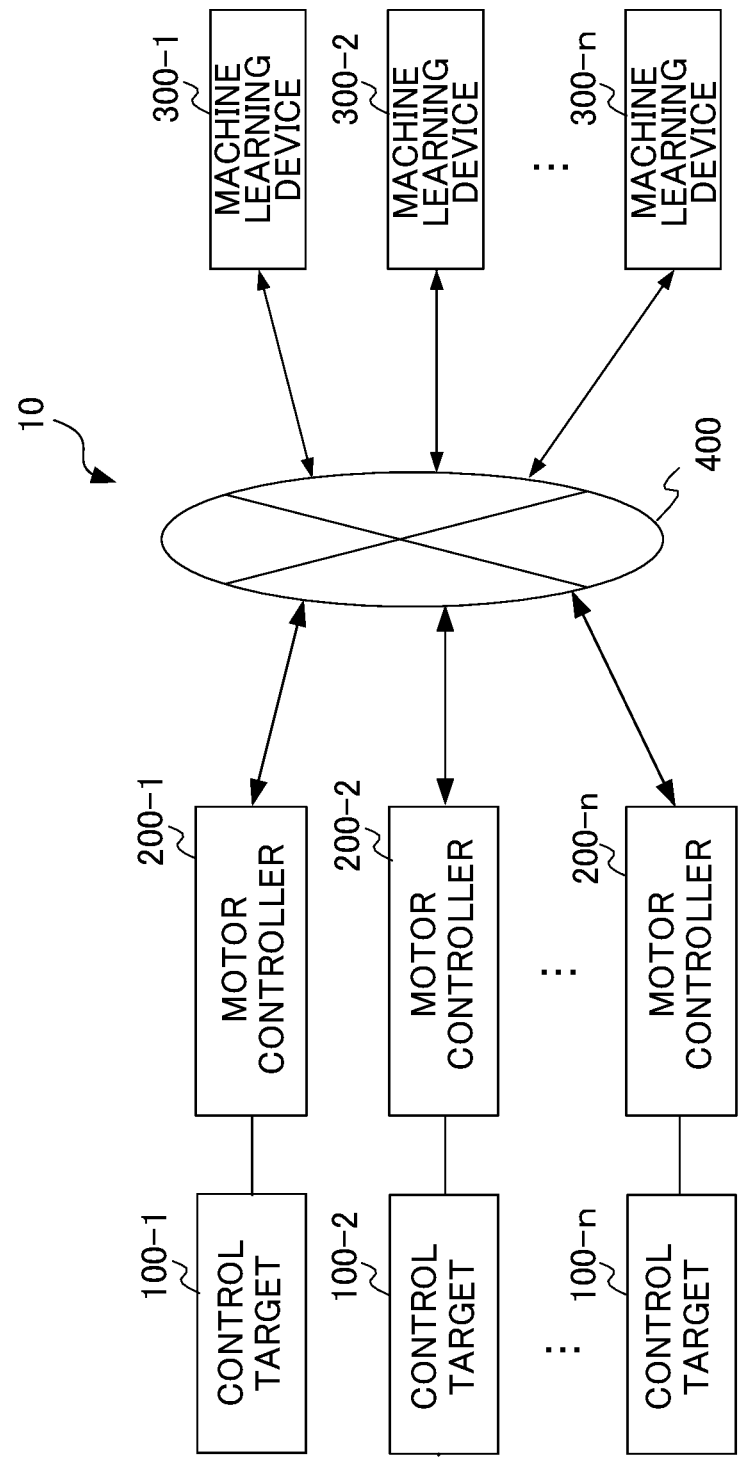
FIG. 1 is a block diagram illustrating a servo motor control system according to a first embodiment of the present invention.

FIG. 1 is a block diagram illustrating a servo motor control system according to a first embodiment of the present invention. As illustrated in FIG. 1, a servo motor control system 10 includes n control targets 100-1 to 100-*n*, n servo motor controllers 200-1 to 200-*n*, n machine learning devices 300-1 to 300-*n*, and a network 400. Here, n is an arbitrary natural number.

The control targets 100-1 to 100-*n* are connected to the servo motor controllers 200-1 to 200-*n*, respectively. The control targets 100-1 to 100-*n* are machine tools, robots, or industrial machines including a servo motor, for example. The servo motor controllers 200-1 to 200-*n* may be provided as part of a machine tool, a robot, or an industrial machine. The servo motor controller 200-1 and the machine learning device 300-1 are paired in a one-to-one relationship and are communicably connected. The servo motor controllers 200-2 to 200-*n* and the machine learning devices 300-2 to 300-*n* are connected similarly to the servo motor controller 200-1 and the machine learning device 300-1. Although n pairs of the servo motor controllers 200-1 to 200-*n* and the machine learning device 300-1 to 300-*n* are connected via the network 400 in FIG. 1, the n pairs of the servo motor controllers 200-1 to 200-*n* and the machine learning devices 300-1 to 300-*n* may be connected directly via connection interfaces, respectively. A plurality of n pairs of the servo motor controllers 200-1 to 200-*n* and the machine learning devices 300-1 to 300-*n* may be provided in the same plant, for example, and may be provided in different plants.

The network 400 is a local area network (LAN) constructed in a plant, the Internet, a public telephone network, a direct connection via a connection interface, or a combination thereof, for example. A specific communication scheme of the network 400, whether the network uses a cable connection or a wireless connection, and the like are not particularly limited.

Figure 2:
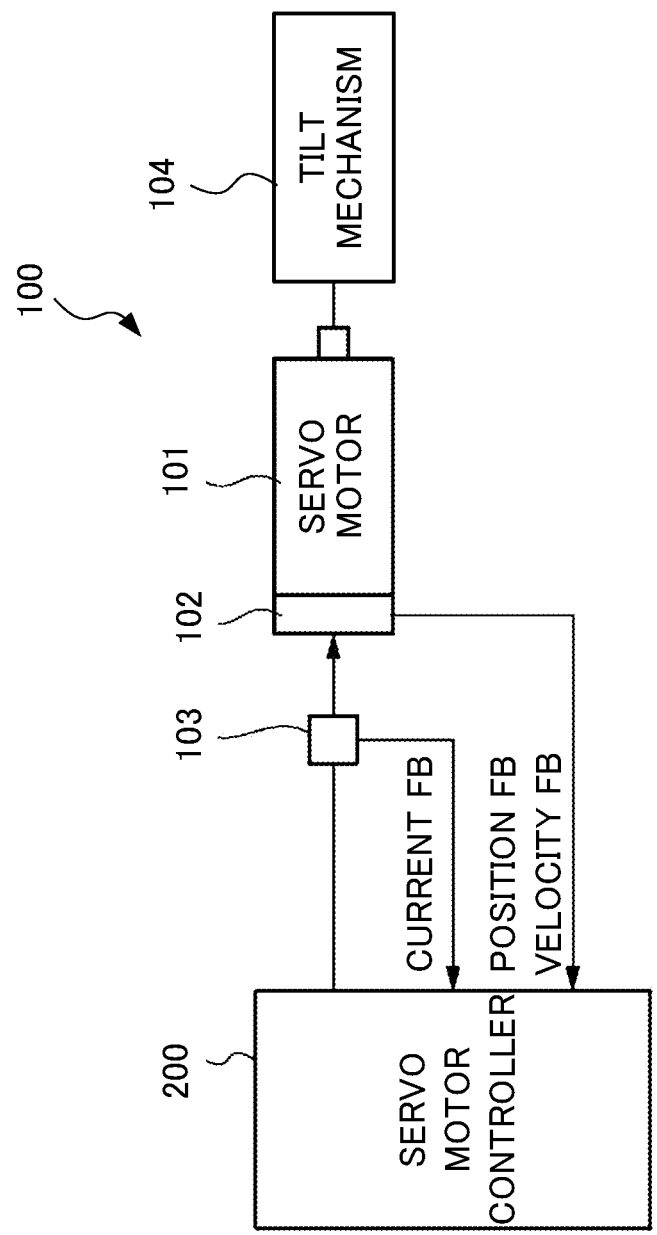
FIG. 2 is a diagram illustrating a configuration of an example of a control target driven by a servo motor controller.

First, a control target 100 of the present embodiment will be described. FIG. 2 is a diagram illustrating a configuration of an example of a control target driven by the servo motor controller. The control target 100 illustrated in FIG. 2 includes a servo motor 101 controlled by a current output from the servo motor controller 200, an encoder (serving as a position detection unit and a velocity detection unit) 102, a current detection unit 103 that detects a current output from the servo motor controller 200, and a tilt mechanism 104. The control target 100 corresponds to the control target 100-1 in FIG. 1, for example.

Figure 3:
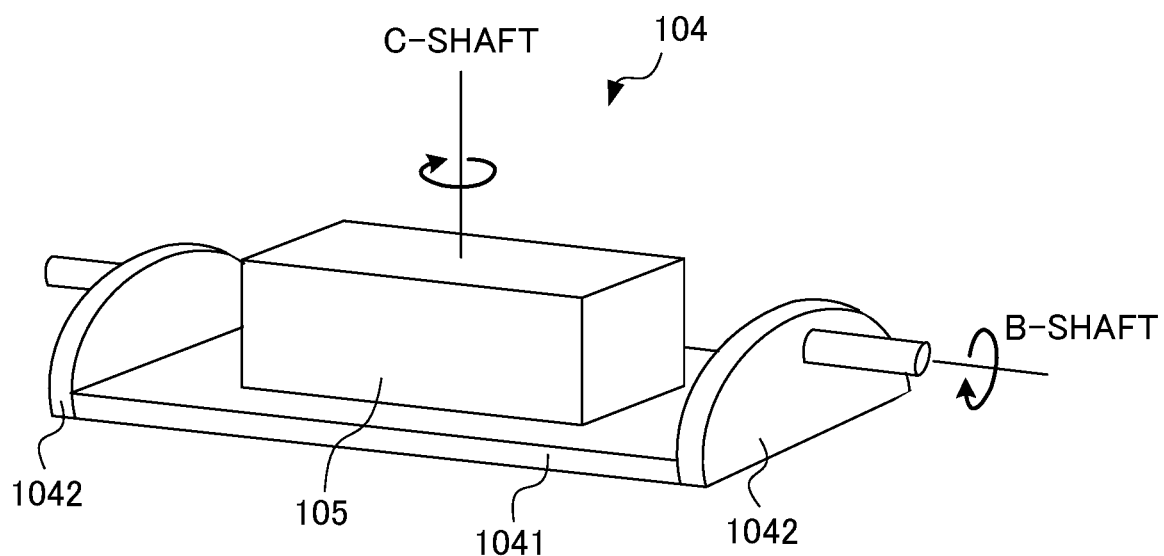
FIG. 3 is a diagram illustrating a configuration of an example of a tilt mechanism on which a work is mounted.
Figure 4:
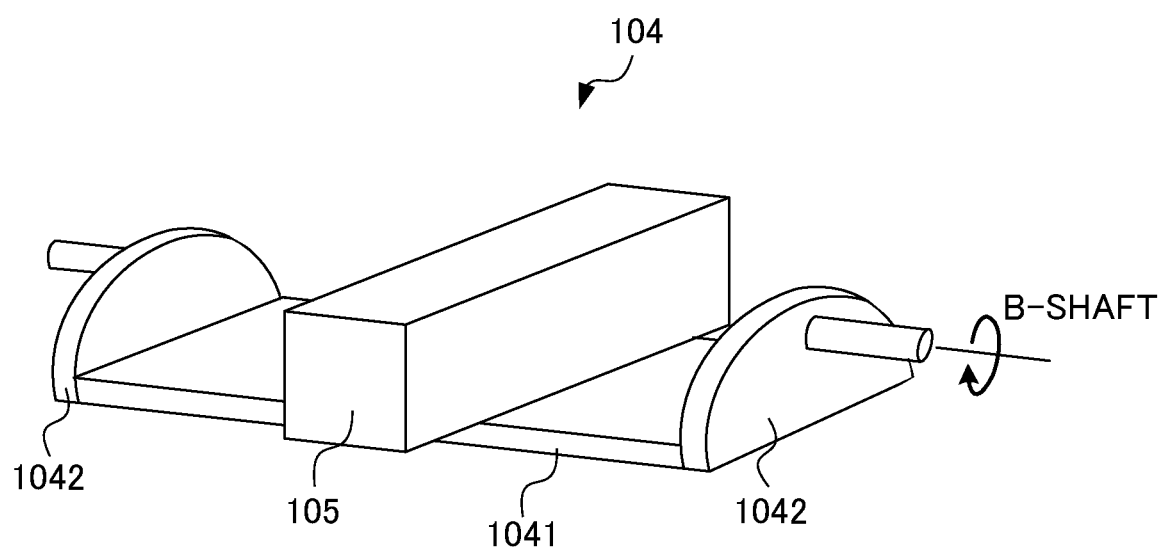
FIG. 4 is a diagram illustrating a configuration of an example of a tilt mechanism when the work illustrated in FIG. 3 is rotated by 90°.

FIG. 3 is a diagram illustrating a configuration of an example of a tilt mechanism on which a work is mounted. FIG. 4 is a diagram illustrating a configuration of an example of a tilt mechanism when the work illustrated in FIG. 3 is rotated by 90°. As illustrated in FIG. 3, the tilt mechanism 104 is rotated and driven with respect to B-shaft by the servo motor 101 to tilt a work 105 machined by a tool. The tilt mechanism 104 includes a table 1041 on which the work 105 is mounted and a pair of supporting members 1042 having an inclined shaft (a rotation shaft). In this manner, the tilt mechanism 104 has an asymmetric configuration with respect to B-shaft. The work 105 is rotated and driven with respect to C-shaft by another servo motor on the table 1041. FIG. 3 illustrates the tilt mechanism 104 in which an axial direction of B-shaft is parallel to a longitudinal direction of the work 105, and FIG. 4 illustrates the tilt mechanism 104 in which the work illustrated in FIG. 3 is rotated by 90° and the longitudinal direction of the work 105 is vertical to the axial direction of B-shaft.

The current detection unit 103 is a current sensor which uses a current transformer or a shunt resistor, for example. The current detected by the current detection unit 103 is used as a current feedback (current FB).

The encoder 102 is provided in association with the servo motor 101 to detect a rotation position of the servo motor 101. Since the rotating position of the servo motor 101 corresponds to the position of the tilt mechanism 104, the encoder 102 detects the position (a machine coordinate, that is, an inclination angle (a rotation angle)) of the tilt mechanism 104. The detected position is used as a position feedback (position FB). Moreover, the encoder 102 detects a rotation velocity of the servo motor 101. Since the rotation velocity of the servo motor 101 corresponds to the velocity of the tilt mechanism 104, the encoder 102 detects the velocity of the tilt mechanism 104. The detected velocity is used as a velocity feedback (velocity FB).

Figure 5:
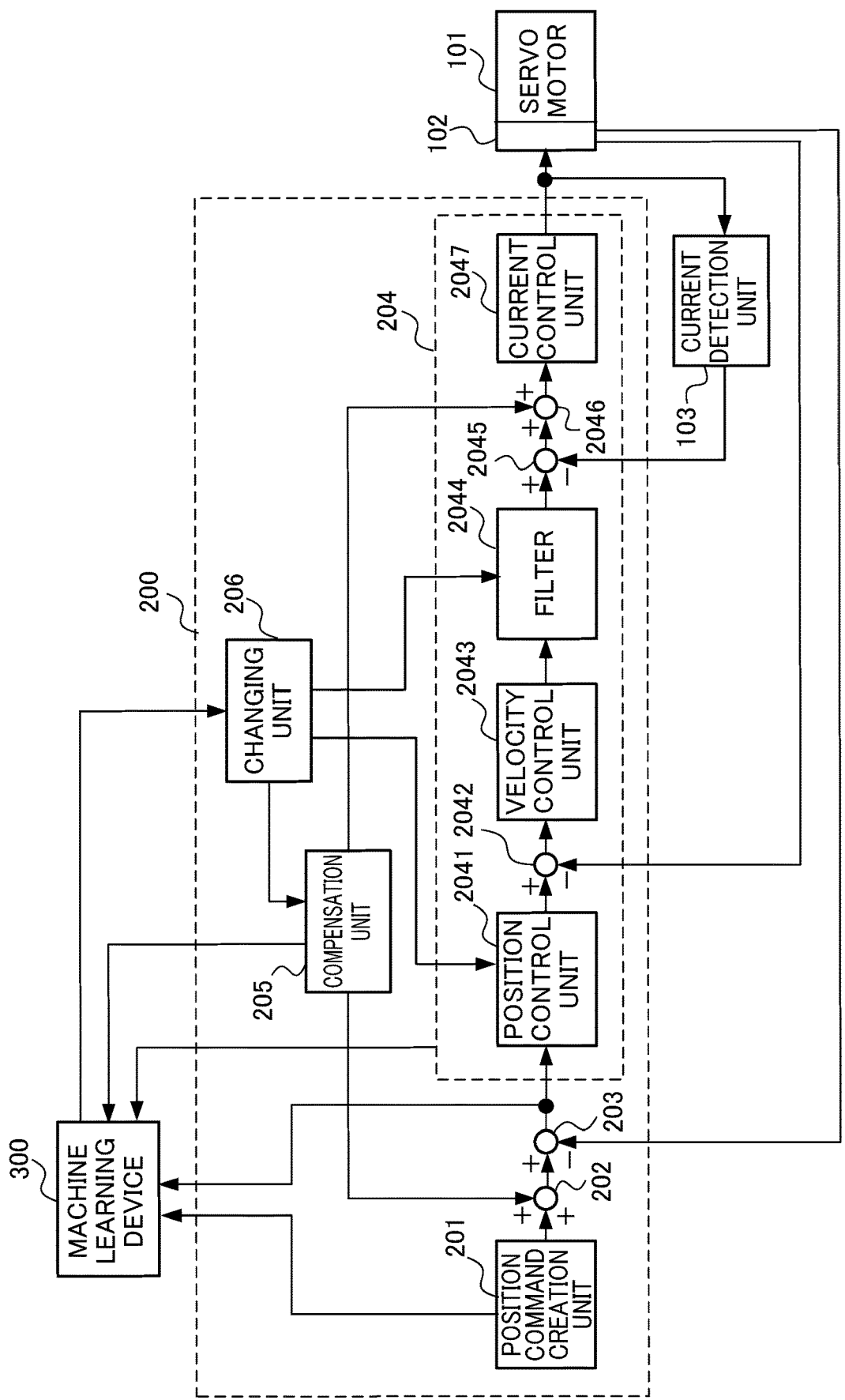
FIG. 5 is a block diagram illustrating a pair made up of a servo motor controller and a machine learning device of the servo motor control system according to the first embodiment of the present invention and a servo motor included in a control target.

Next, the servo motor controller 200 will be described. FIG. 5 is a block diagram illustrating a pair of the servo motor controller 200 and the machine learning device 300 of the servo motor control system according to the first embodiment of the present invention and a servo motor included in a control target. The servo motor controller 200 and the machine learning device 300 in FIG. 5 correspond to the servo motor controller 200-1 and the machine learning device 300-1 illustrated in FIG. 1, for example.

As illustrated in FIG. 5, the servo motor controller 200 includes a position command creation unit 201, an adder 202, a subtractor 203, a control unit 204, a compensation unit 205, and a changing unit 206. The control unit 204 includes a position control unit 2041, a subtractor 2042, a velocity control unit 2043, a filter 2044, a subtractor 2045, an adder 2046, and a current control unit 2047. The control unit 204 controls rotation of the servo motor 101. Some or all of the adder 202, the subtractor 203, the compensation unit 205, and the changing unit 206 may be included in the control unit 204. The rotation velocity of the servo motor 101 is detected by the encoder 102 associated with the servo motor 101, and the detected velocity detection value is input to the subtractor 2042 as a velocity feedback (velocity FB). The position detection value detected by the encoder 102 is input to the subtractor 203 as a position feedback (position FB). The current detection unit 103 detects a current output from the control unit 204 to the servo motor 101, and the current detection value is input to the subtractor 2045 as a current feedback (current FB).

The position command creation unit 201 creates a position command value for operating the servo motor 101 according to a program input from a host controller, an external input device, or the like, which is not illustrated, and outputs the created position command value to the adder 202 and the machine learning device 300. The position command creation unit 201 changes a pulse frequency to create the position command value in order to change the velocity of the servo motor 101 so that a machining shape designated by a program is obtained.

The adder 202 adds a position command compensation value output from the compensation unit 205 to the position command value and outputs an addition value to the subtractor 203. The subtractor 203 calculates a difference between the position command value corrected by the position command compensation value and the position-feedback position detection value and outputs the difference to the position control unit 2041 and the machine learning device 300 as a positional error.

The position control unit 2041 outputs a value obtained by multiplying a predetermined position gain Kp with the positional error output from the subtractor 203, for example, to the subtractor 2042 as a velocity command value.

The subtractor 2042 calculates a difference between the output of the position control unit 2041 and a velocity-feedback velocity detection value and outputs the difference to the velocity control unit 2043 as a velocity error.

The velocity control unit 2043 adds a value obtained by multiplying and integrating a predetermined integral gain $K1v$ with the velocity error output from the subtractor 2042 and a value obtained by multiplying a predetermined proportional gain $K2v$ with the velocity error output from the subtractor 2042, for example, and outputs an addition value to a filter 2044 as a torque command value. The filter 2044 is a notch filter for vibration suppression, for example, and attenuates a signal (the torque command value) having a frequency in a predetermined frequency range on the basis of a filter constant to output the attenuated signal to the subtractor 2045.

The subtractor 2045 calculates a difference between the torque command value output from the filter 2044 and a current-feedback current detection value and outputs the difference to the adder 2046 as a current error. The adder 2046 adds the current error output from the subtractor 2045 and the output of the compensation unit 205 and outputs a current error corrected by the addition to the current control unit 2047. The current control unit 2047 controls the servo motor 101 on the basis of the corrected current error.

The compensation unit 205 outputs a torque offset value to the adder 2046. The compensation unit 205 may output a position command compensation value to the adder 202 and add the position command compensation value to the position command value output from the position command creation unit 201 to obtain a torque offset rather than adding the torque offset value to the current error output from the subtractor 2045. Moreover, the compensation unit 205 may add the torque offset value to the current error output from the subtractor 2045 and add the position command compensation value to the position command value output from the position command creation unit 201. Although the compensation unit 205 is connected to the adder 202 and the adder 2046 in FIG. 5, the compensation unit 205 may be connected to either one of the adders 202 and 2046. When the compensation unit 205 outputs the torque offset value only to the adder 2046, the adder 202 may not be provided. When the position command compensation value only is output to the adder 202, the adder 2046 may not be provided. The changing unit 206 changes the position gain Kp of the position control unit 2041, a filter coefficient of the filter 2044, and the torque offset value or the position command compensation value output from the compensation unit 205 on the basis of action information or optimization action information from the machine learning device 300. The details of the machine learning device 300 will be described later.

When the servo motor 101 rotates and drives the tilt mechanism 104 with respect to B-shaft, a load inertia that B-shaft receives changes depending on the rotation position with respect to C-shaft, of the work 105 on the table 1041. Although the load inertia that B-shaft receives depends on the moment of inertia around B-shaft, the moment of inertia around B-shaft by the table 1041 and the supporting member 1042 does not change from the state of FIG. 3 to the state of FIG. 4. However, the moment of inertia around B-shaft by the work 105 changes depending on the rotation position with respect to C-shaft, of the work 105 on the table 1041. As illustrated in FIG. 3, the moment of inertia around B-shaft of the work 105 is the smallest when the axial direction of B-shaft is parallel to the longitudinal direction of the work 105. On the other hand, as illustrated in FIG. 4, the moment of inertia around B-shaft of the work 105 is the largest when the longitudinal direction of the work 105 is vertical to the axial direction of B-shaft. Therefore, the load inertia that B-shaft receives is the smallest in the state of FIG. 3 and is the largest in the state of FIG. 4.

When the load inertia acting on B-shaft increases, the driving force becomes insufficient and the time at which the position of the work 105 reaches a target position is delayed. Therefore, the position gain Kp of the position control unit 2041 is preferably small when the load inertia is small, and the position gain Kp of the position control unit 2041 is preferably large when the load inertia is large. For example, the position gain Kp can be expressed as $Kp=b+c \times |\sin \theta|$ when b is a fixed value, c is a compensation coefficient (parameter), and the angle $\theta$ is a rotation angle around C-shaft. Here, the angle $\theta$ is 00 in the state of FIG. 3 and is 90° in the state of FIG. 4. The changing unit 206 changes the compensation coefficient c of the position gain Kp on the basis of the action information or the optimization action information from the machine learning device 300.

The servo motor controller has high-frequency resonance characteristics when the load inertia acting on B-shaft is small, and the servo motor controller has low-frequency resonance characteristics when the load inertia acting on B-shaft is large. Therefore, the filter coefficient of the filter 2044 is set to attenuate high-frequency signals when the load inertia is small, and the filter coefficient of the filter 2044 is set to attenuate low-frequency signals when the load inertia is large. For example, a filter coefficient F can be expressed as $F=d+e \times f(\theta)$ when d is a fixed value, e is a compensation coefficient (parameter), and $f(\theta)$ is a function that depends on the angle $\theta$. The function $f(\theta)$ is a function determined appropriately by a circuit configuration of the filter 2044. The changing unit 206 changes the compensation coefficient e on the basis of the action information or the optimization action information from the machine learning device 300.

Figure 6:
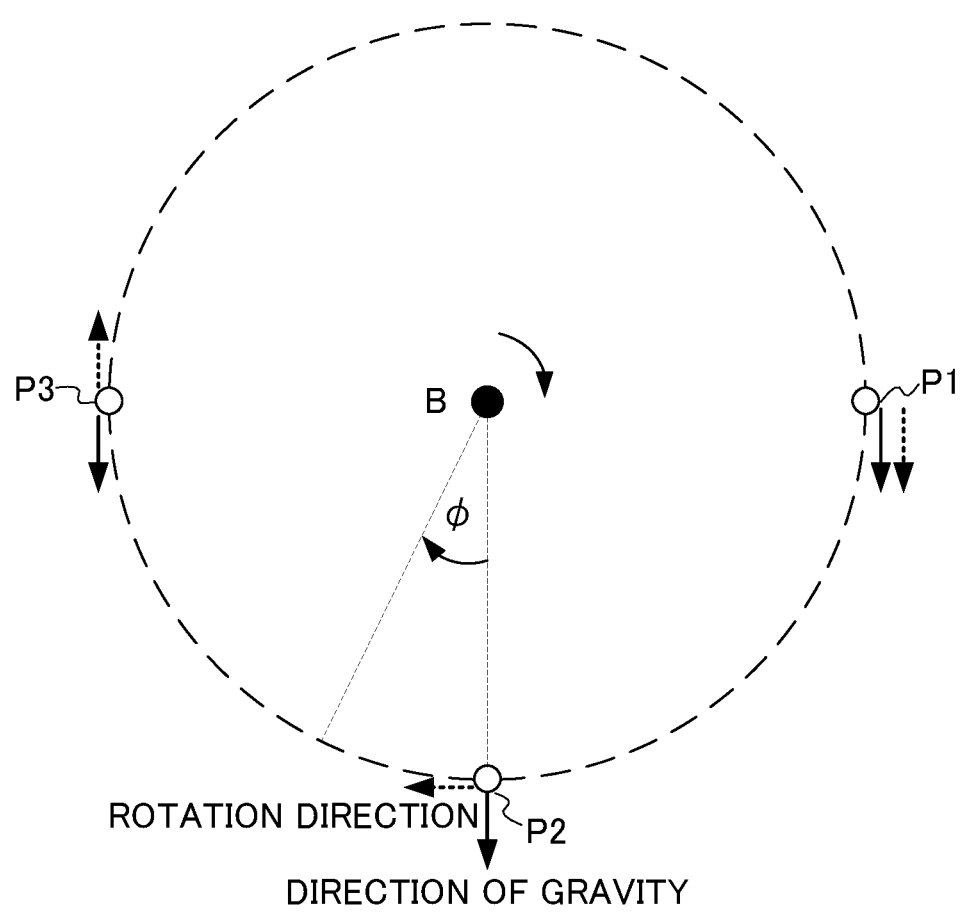
FIG. 6 is a diagram for describing how a torque changes depending on a rotation angle of the control target illustrated in FIG. 2.

In the control target 100 illustrated in FIG. 2, a normal torque for resisting against the gravity changes depending on the position of B-shaft. For example, the influence of the gravity on B-shaft is the largest when B-shaft is lateral (horizontal) and the influence of the gravity on B-shaft disappears when B-shaft is vertical. When B-shaft is lateral (horizontal) and the tilt mechanism 104 is rotated and driven with respect to B-shaft, the torque with respect to B-shaft changes depending on the position of the supporting member 1042 and the table 1041 having the work 105 mounted thereon due to the influence of the gravity and the rotation acting on the work 105, the table 1041, and the supporting member 1042. As illustrated in FIG. 6, for example, the torque with respect to B-shaft changes such that, when the table 1041 having the work 105 mounted thereon rotates around B-shaft, the position of the center of gravity with respect to the rotation of the table 1041 having the work 105 mounted thereon moves from position P1 to position P2 and from position P2 to position P3. The direction of gravity is identical to the rotation direction at position P1 of the center of gravity, the direction of gravity is different from the rotation direction by 90° at position P2, and the direction of gravity is opposite to the rotation direction at position P3. Therefore, the torque offset value or the position command compensation value output from the compensation unit 205 is changed so that the torque offset increases when the influence of gravity is large and the torque offset decreases when the influence of gravity is small. For example, the torque offset value or the position command compensation value can be expressed as h+g×sin ϕ when h is a fixed value and g is a compensation coefficient (parameter). Here, the angle ϕ is −90° at the position P1 in FIG. 6, 0° at the position P2, and 90° at the potential P3. The positions P1, P2, and P3 are examples of the position of the center of gravity of the table 1041 having the work 105 mounted thereon and there is no particular limitation thereto. The changing unit 206 changes the compensation coefficient g on the basis of the action information or the optimization action information from the machine learning device 300. Since the influence of gravity decreases as B-shaft approaches a vertical direction, the initial values of the fixed value h and the compensation coefficient g are set appropriately. When the load inertia changes, at least one of the integral gain K1v and the proportional gain K2v of the velocity control unit 2043 may be changed instead of changing the position gain Kp of the position control unit 2041. Moreover, the position gain Kp of the position control unit 2041 and at least one of the integral gain K1v and the proportional gain K2v of the velocity control unit 2043 may be changed. In this case, the changing unit 206 changes at least one of the integral gain K1v and the proportional gain K2v of the velocity control unit 2043 instead of or together with the compensation coefficient c of the position gain Kp. From the control unit 204 to the machine learning device 300, the position control unit 2041 transmits the compensation coefficient c, the filter 2044 transmits the compensation coefficient e of the filter coefficient F, and the compensation unit 205 transmits the compensation coefficient g.

<Machine Learning Device 300>

The machine learning device 300 can learn the compensation coefficient c of the position gain Kp of the position control unit 2041 of the control unit 204 of the servo motor controller 200, the compensation coefficient e of the filter coefficient F of the filter 2044 of the control unit 204, and the compensation coefficient g of the torque offset value or/and the position command compensation value of the compensation unit 205 by executing a predetermined evaluation program (hereinafter referred to as an "evaluation program"). The machine learning device 300 may learn the compensation coefficient of at least one of the integral gain K1v and the proportional gain K2v of the velocity control unit 2043 instead of or together with the compensation coefficient c of the position gain Kp. Moreover, the machine learning device 300 can perform learning using a machining program to be used actually instead of the evaluation program as a preparation step before performing machining. The evaluation program or the machining program to be used actually in a preparation step is referred to as a predetermined program. Hereinafter, it will be described that the machine learning device 300 performs learning by executing an evaluation program as a predetermined program. Moreover, it will be described that the machine learning device 300 learns the compensation coefficient g of the torque offset value of the compensation unit 205.

First, a configuration of the machine learning device 300 will be described. The machine learning device 300 learns a combination of the compensation coefficient c of the position gain Kp, the compensation coefficient e of the filter coefficient F, and the compensation coefficient g of the torque offset value of the compensation unit 205 for reducing a positional error when the servo motor controller 200 drives the control target 100 on the basis of the evaluation program. A plurality of evaluation programs having different combinations of the ranges of rotation angles θ and ϕ are prepared as the evaluation program, and these evaluation programs are executed whereby the machine learning device 300 performs learning. For example, the machine learning device 300 can perform learning by sequentially executing a first evaluation program that operates a machine tool in a range where the rotation angle θ is between 0° and 30° and the rotation angle ϕ is between −30° and 300, a second evaluation program that operates a machine tool in a range where the rotation angle θ is between 30° and 60° and the rotation angle ϕ is between −30° and 30°, and a third evaluation program that operates a machine tool in a range where the rotation angle θ is between 60° and 90° and the rotation angle ϕ is between −300 and 30°.

Prior to description of respective functional blocks included in the machine learning device 300, first, a basic mechanism of reinforcement learning will be described. An agent (corresponding to the machine learning device 300 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for reducing a positional error, is obtained.

Here, although an arbitrary learning method is used as the reinforcement learning, in the description below, Q-learning which is a method of learning a value function Q(S,A) of selecting an action A under a certain environment state S will be described as an example. An object of the Q-learning is to select an action A having the highest value function Q(S,A) as an optimal action among actions A that can be taken in a certain state S.

However, at an initial time at which the Q-learning starts, the correct value of the value function Q(S,A) is not known at all for a combination of the state S and the action A. Therefore, the agent learns the correct value function Q(S,A) by selecting various actions A under a certain state S and selecting a better action on the basis of rewards given for the selected actions A.

Since it is desired to maximize a total reward obtained in the future, it is aimed to finally attain a relation of $Q(S,A)=E[\Sigma(\gamma^t)r_t]$. Here, E[ ] indicates an expected value, t indicates time, $\gamma$ is a parameter called a discount factor to be described later, $r_t$ is a reward at time t, and $\Sigma$ is the sum at time t. In this expression, the expected value is an expected value when the state were changed according to an optimal action. However, since it is unclear which action is optimal in the process of Q-learning, reinforcement learning is performed while searching for an optimal action by performing various actions. An update expression of such a value function Q(S,A) can be represented by Expression 1 below (Math. 1).

$$Q(S_{t+1}, A_{t+1}) \leftarrow$$
$$Q(S_t, A_t) + \alpha\left(r_{t+1} + \gamma \max_A Q(S_{t+1}, A) - Q(S_t, A_t)\right)$$
[Math. 1]

In Expression 1, $S_t$ indicates an environment state at time t, and $A_t$ indicates an action at time t. By the action $A_t$, the state changes to $S_{t+1}$.

$r_{t+1}$ indicates a reward obtained by the change in the state. Moreover, a term with max is a multiplication of the Q value by $\gamma$ when an action A having the highest Q value known at that moment was selected under the state $S_{t+1}$. Here, $\gamma$ is a parameter of $0<\gamma\leq1$ and is called a discount rate. Moreover, a is a learning coefficient and is in the range of $0<\alpha\leq1$.

Expression 1 indicates a method of updating a value function $Q(S_t,A_t)$ of an action $A_t$ in a state $S_t$ on the basis of a returning reward $r_{t+1}$ when the action $A_t$ is performed. This update expression indicates that if the value $\max_a Q(S_{t+1},A)$ of the best action in the next state $S_{t+1}$ associated with an action At is larger than the value function $Q(S_t,A_t)$ of an action At in the state $S_t$, $Q(S_t,A_t)$ is increased, and if otherwise, $Q(S_t,A_t)$ is decreased. That is, the value of a certain action in a certain state approaches the value of the best action in the next state associated with the action. However, although this difference differs depending on the discount rate $\gamma$ and the reward $r_{t+1}$, the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to converge when the values of the value functions Q(S,A) of all state-action pairs are to be calculated since the number of states is too large.

Thus, Q-learning may use an existing technique called a deep Q-network (DQN). Specifically, the value of the value function Q(S,A) may be calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in Non-Patent Document below, for example.

Non-Patent Document

"Human-level control through deep reinforcement learning", Volodymyr Mnihl [online], [searched on Jan. 17, 2017], Internet <URL: http://files.davidqiu.com/research/nature14236.pdf>

The machine learning device 300 performs the above-described Q-learning. Specifically, the machine learning device 300 learns a value function Q of selecting an action A of adjusting the compensation coefficient c of the position gain Kp of the position control unit 2041, the compensation coefficient e of the filter coefficient F of the filter 2044, and the compensation coefficient g of the torque offset value of the compensation unit 205, associated with a servo state S such as commands and feedbacks, including the compensation coefficient c of the position gain Kp of the position control unit 2041, the compensation coefficient e of the filter coefficient F of the filter 2044, the compensation coefficient g of the torque offset value of the compensation unit 205 of the servo motor controller 200, and the position command and the positional error information of the servo motor controller 200 acquired by executing the evaluation program.

The machine learning device 300 observes the state information S including the servo state such as commands and feedbacks, including the position command and the positional error information of the servo motor controller 200 obtained by executing the evaluation program on the basis of the compensation coefficient c of the position gain Kp of the position control unit 2041, the compensation coefficient e of the filter coefficient F of the filter 2044, and the compensation coefficient g of the torque offset value of the compensation unit 205 to determine the action A. The machine learning device 300 returns a reward whenever the action A is executed. The machine learning device 300 searches for the optimal action A so that a total future reward is maximized by trial-and-error learning. By doing so, the machine learning device 300 can select the optimal action A (that is, an optimal combination of the compensation coefficient c of the position gain Kp of the position control unit 2041, the compensation coefficient e of the filter coefficient F of the filter 2044, and the compensation coefficient g of the torque offset value of the compensation unit 205) with respect to the state S including the servo state such as commands and feedbacks including the position command and the positional error information of the servo motor controller 200 acquired by executing the evaluation program on the basis of the compensation coefficient c of the position gain Kp of the position control unit 2041, the compensation coefficient e of the filter coefficient F of the filter 2044, and the compensation coefficient g of the torque offset value of the compensation unit 205.

That is, such an action A that maximizes the Q value is selected among actions A to be applied to the compensation coefficient c of the position gain Kp of the position control unit 2041, the compensation coefficient e of the filter coefficient F of the filter 2044, and the compensation coefficient g of the torque offset value of the compensation unit 205, associated with a certain state S on the basis of the value function Q learned by the machine learning device 300. By doing so, it is possible to select such an action A (that is, a combination of the compensation coefficient c of the position gain Kp of the position control unit 2041, the compensation coefficient e of the filter coefficient F of the filter 2044, and the compensation coefficient g of the torque offset value of the compensation unit 205) that minimizes the positional error acquired by executing the evaluation program.

Figure 7:
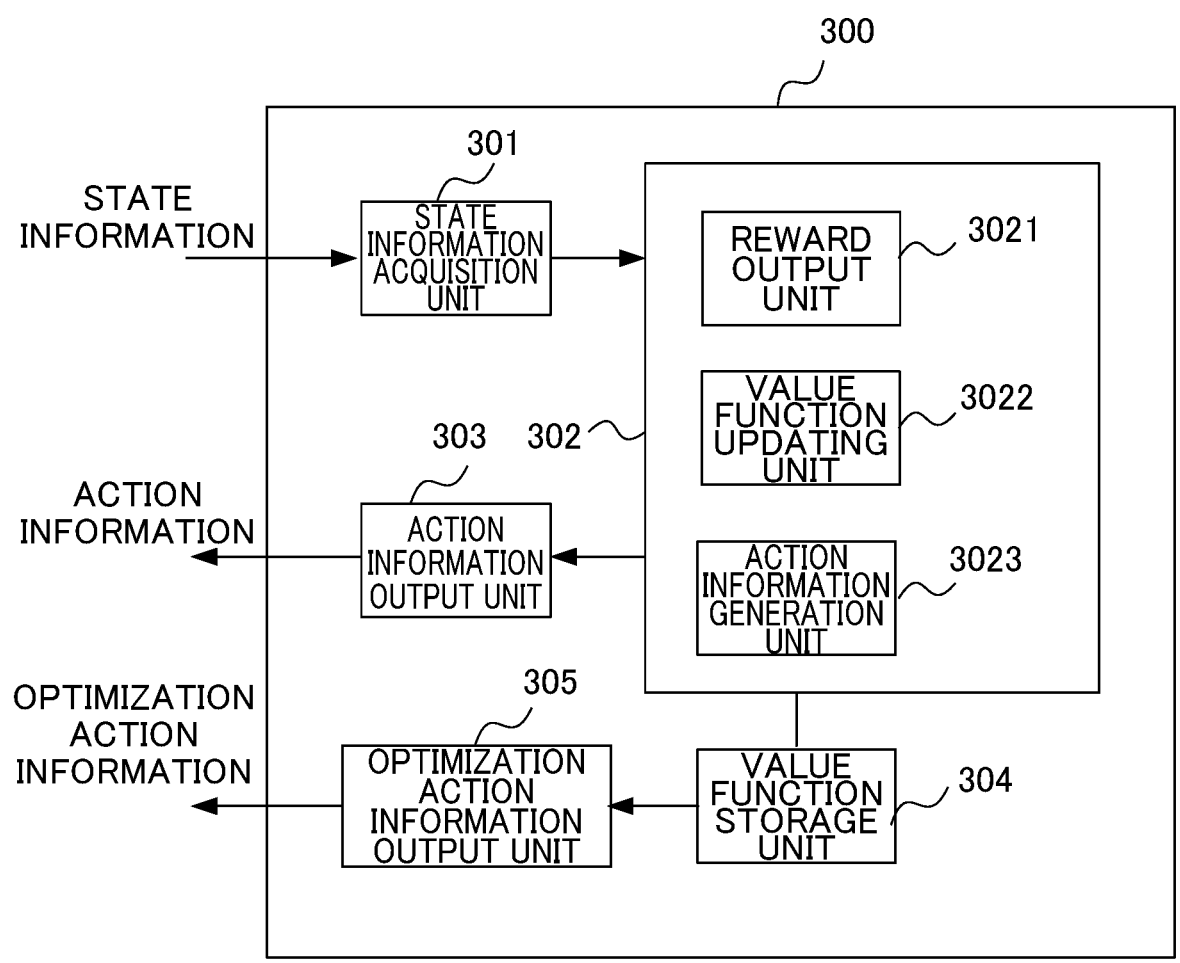
FIG. 7 is a block diagram illustrating a machine learning device according to the first embodiment of the present invention.

FIG. 7 is a block diagram illustrating the machine learning device 300 according to the first embodiment of the present invention. As illustrated in FIG. 7, in order to perform the reinforcement learning, the machine learning device 300 includes a state information acquisition unit 301, a learning unit 302, an action information output unit 303, a value function storage unit 304, and an optimization action information output unit 305.

The state information acquisition unit 301 acquires, from the servo motor controller 200, the state S including the servo state such as commands and feedbacks, including the position command and the positional error of the servo motor controller 200 acquired by executing the evaluation program on the basis of the compensation coefficient c of the position gain Kp of the position control unit 2041, the compensation coefficient e of the filter coefficient F of the filter 2044, and the compensation coefficient g of the torque offset value of the compensation unit 205 of the servo motor controller 200. The state information S corresponds to the environment state S in the Q-learning. The state information acquisition unit 301 outputs the acquired state information S to the learning unit 302. The compensation coefficient c of the position gain Kp of the position control unit 2041, the compensation coefficient e of the filter coefficient F of the filter 2044, and the compensation coefficient g of the torque offset value of the compensation unit 205 at the time point at which the Q-learning starts initially may be generated by a user in advance. In the present embodiment, for example, the machine learning device 300 adjusts the initial setting values of the compensation coefficient c of the position gain Kp of the position control unit 2041, the compensation coefficient e of the filter coefficient F of the filter 2044, and the compensation coefficient g of the torque offset value of the compensation unit 205 created by the user to optimal values by reinforcement learning.

The learning unit 302 is a unit that learns the value function Q(S,A) when a certain action A is selected under a certain environment state S. Specifically, the learning unit 302 includes a reward output unit 3021, a value function updating unit 3022, and an action information generation unit 3023.

The reward output unit 3021 is a unit that calculates a reward when the action A is selected under a certain state S. Here, a set (a positional error set) of positional errors which are state variables of the state S will be denoted by PD(S), and a positional error set which is state variables related to state information S' changed from the state S due to the action information A (correction of the compensation coefficient c of the position gain Kp of the position control unit 2041, the compensation coefficient e of the filter coefficient F of the filter 2044, and the compensation coefficient g of the torque offset value of the compensation unit 205) will be denoted by PD(S'). Moreover, the evaluation function in the state S outputs a value calculated on the basis of a predetermined evaluation function f(PD(S)) as the value of a positional error in the state S. The following functions can be used as the evaluation function f, for example. A function that calculates an integrated value of an absolute value of a positional error $\int |e| dt$ A function that calculates an integrated value by weighting an absolute value of a positional error with time $\int t|e| dt$ A function that calculates an integrated value of a 2n-th power (n is a natural number) of an absolute value of a positional error $\int e^{2n} dt$ (n is a natural number)

A function that calculates a maximum value of an absolute value of a positional error $Max\{|e|\}$ Here, e in the evaluation function f indicates a positional error. The evaluation function is not limited thereto. The evaluation function in the state S may be a function that evaluates the positional error value in the state S appropriately on the basis of the positional error set PD(S).

In this case, the reward output unit 3021 sets the value of a reward to a negative value when the evaluation function value f(PD(S')) of the positional error of the servo motor controller 200 operated using the control unit 204 and the compensation unit 205 after the correction related to the state information S' corrected by the action information A is larger than the evaluation function value f(PD(S)) of the positional error of the servo motor controller 200 operated using the control unit 204 and the compensation unit 205 before correction related to the state information S before being corrected by the action information A.

On the other hand, the reward output unit 3021 sets the value of a reward to a positive value when the evaluation function value f(PD(S')) of the positional error of the servo motor controller 200 operated using the control unit 204 and the compensation unit 205 after the compensation related to the state information S' corrected by the action information A is smaller than the evaluation function value f(PD(S)) of the positional error of the servo motor controller 200 operated using the control unit 204 and the compensation unit 205 before correction related to the state information S before being corrected by the action information A.

The reward output unit 3021 sets the value of a reward to zero when the evaluation function value f(PD(S')) of the positional error of the servo motor controller 200 operated using the control unit 204 and the compensation unit 205 after the correction related to the state information S' corrected by the action information A is equal to the evaluation function value f(PD(S)) of the positional error of the servo motor controller 200 operated using the control unit 204 and the compensation unit 205 before correction related to the state information S before being corrected by the action information A.

Furthermore, the negative value when the evaluation function value f(PD(S')) of the positional error in the state S' after execution of the action A is larger than the evaluation function value f(PD(S)) of the positional error in the previous state S may increase according to a proportion. That is, the negative value may increase according to the degree of increase in the evaluation function value of the positional error. In contrast, the positive value when the evaluation function value f(PD(S')) of the positional error in the state S' after execution of the action A is smaller than the evaluation function value f(PD(S)) of the positional error in the previous state S may increase according to a proportion. That is, the positive value may increase according to the degree of decrease in the evaluation function value of the positional error.

The value function updating unit 3022 updates the value function Q stored in the value function storage unit 304 by performing Q-learning on the basis of the state S, the action A, the state S' when the action A was applied to the state S, and the value of the reward calculated in this manner. The update of the value function Q may be performed by online learning, batch learning, or mini-batch learning.

Online learning is a learning method of applying a certain action A to a present state S and updating the value function Q immediately whenever the present state S transitions to a new state S'. Batch learning is a learning method of applying a certain action A to a present state S and repeated attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generating unit 3023 selects the action A in the process of Q-learning with respect to the present state S. The action information generation unit 3023 generates action information A and outputs the generated action information A to the action information output unit 303 in order to perform an operation (corresponding to the action A of Q-learning) of correcting the compensation coefficient c of the position gain Kp of the position control unit 2041, the compensation coefficient e of the filter coefficient F of the filter 2044, and the compensation coefficient g of the torque offset value of the compensation unit 205 of the servo motor controller 200 in the process of Q-learning. More specifically, the action information generation unit 3023 adds or subtracts the compensation coefficient c of the position gain Kp of the position control unit 2041, the compensation coefficient e of the filter coefficient F of the filter 2044, and the compensation coefficient g of the torque offset value of the compensation unit 205 included in the action A incrementally with respect to the compensation coefficient c of the position gain Kp of the position control unit 2041, the compensation coefficient e of the filter coefficient F of the filter 2044, and the compensation coefficient g of the torque offset value of the compensation unit 205 included in the state S, for example. In this case, the compensation coefficient e of the filter coefficient is adjusted so that high-frequency signals are attenuated when the position gain Kp of the position control unit 2041 is decreased.

When the compensation coefficient c of the position gain Kp, the compensation coefficient e of the filter coefficient F, and the compensation coefficient g of the torque offset value are increased or decreased, the state S transitions to the state S', and a plus reward (a positive reward) is returned, the action information generation unit 3023 may select a policy of selecting such an action A' that further decreases the value of the positional error such as incrementally increasing or decreasing the compensation coefficient c of the position gain Kp, the compensation coefficient e of the filter coefficient F, and the compensation coefficient g of the torque offset value similarly to the previous action as the next action A'.

In contrast, when a minus reward (a negative reward) is returned, the action information generation unit 3023 may select a policy of selecting such an action A' that decreases the positional error to be smaller than the previous value such as incrementally decreasing or increasing the compensation coefficient c of the position gain Kp, the compensation coefficient e of the filter coefficient F, and the compensation coefficient g of the torque offset value contrarily to the previous action as the next action A', for example.

The action information generation unit 3023 may select a policy of selecting the action A' according to a known method such as a greedy method of selecting an action A' having the highest value function Q(S,A) among the values of presently estimated actions A and an e-greedy method of randomly selecting an action A' with a certain small probability e and selecting an action A' having the highest value function Q(S,A) in other cases.

The action information output unit 303 is a unit that the action information A output from the learning unit 302 to the changing unit 206 of the servo motor controller 200. As described above, the servo motor controller 200 finely adjusts the present state S (that is, the presently set compensation coefficient c of the position gain Kp of the position control unit 2041, the compensation coefficient e of the filter coefficient F of the filter 2044, and the compensation coefficient g of the torque offset value of the compensation unit 205) on the basis of the action information to thereby transition to the next state S' (that is, the corrected compensation coefficient c of the position gain Kp of the position control unit 2041, the compensation coefficient e of the filter coefficient F of the filter 2044, and the compensation coefficient g of the torque offset value of the compensation unit 205).

The value function storage unit 304 is a storage device that stores the value function Q. The value function Q may be stored as a table (hereinafter referred to as an action value table) for each state S and each action A, for example. The value function Q stored in the value function storage unit 304 is updated by the value function updating unit 3022. Moreover, the value function Q stored in the value function storage unit 304 may be shared with other machine learning devices 300. When the value function Q is shared by a plurality of machine learning devices 300, since reinforcement learning can be performed in a manner of being distributed to the respective machine learning devices 300, it is possible to improve the reinforcement learning efficiency.

The optimization action information output unit 305 generates the action information A (hereinafter referred to as "optimization action information") for causing the control unit 204 and the compensation unit 205 to perform an operation of maximizing the value function Q(S,A) on the basis of the value function Q updated by the value function updating unit 3022 performing the Q-learning. More specifically, the optimization action information output unit 305 acquires the value function Q stored in the value function storage unit 304. As described above, the value function Q is updated by the value function updating unit 3022 performing the Q-learning. The optimization action information output unit 305 generates the action information on the basis of the value function Q and outputs the generated action information to the servo motor controller 200 (the changing unit 206). The optimization action information includes information that corrects the compensation coefficient c of the position gain Kp of the position control unit 2041, the compensation coefficient e of the filter coefficient F of the filter 2044, and the compensation coefficient g of the torque offset value of the compensation unit 205 similarly to the action information that the action information output unit 303 outputs in the process of Q-learning.

In the servo motor controller 200, the compensation coefficient c of the position gain Kp of the position control unit 2041, the compensation coefficient e of the filter coefficient F of the filter 2044, and the compensation coefficient g of the torque offset value of the compensation unit 205 are corrected on the basis of the action information, whereby the servo motor controller 200 can operate so that the value of the positional error is reduced. In this manner, the use of the machine learning device 300 according to the present embodiment enables simplification of the adjustment of the compensation coefficient c of the position gain Kp of the position control unit 2041, the compensation coefficient e of the filter coefficient F of the filter 2044, and the compensation coefficient g of the torque offset value of the compensation unit 205 of the servo motor controller 200.

Hereinabove, the functional blocks included in the servo motor controller 200 and the machine learning device 300 have been described. In order to realize these functional blocks, the servo control device 200 and the machine learning device 300 each include an arithmetic processing unit such as a central processing unit (CPU). The servo control device 200 and the machine learning device 300 each further include an auxiliary storage device such as a hard disk drive (HDD) for storing various control programs such as application software or an operating system (OS) and a main storage device such as a random access memory (RAM) for storing data temporarily required when the arithmetic processing device executes a program.

In each of the servo motor control device 200 and the machine learning device 300, the arithmetic processing device reads an application software and an OS from the auxiliary storage device, and develops the read application software and OS in the main storage device to perform arithmetic processing on the basis of the read application software and OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 300 involves a large amount of computation associated with the machine learning, graphics processing units (GPUs) may be mounted on a personal computer and be used for arithmetic processing associated with the machine learning using a technique called general-purpose computing on graphics processing units (GPGPUs). The machine learning device 300 can perform high velocity processing using the GPGPU. Furthermore, in order for the machine learning device 300 to perform higher velocity processing, a computer cluster may be built using a plurality of computers equipped with such GPUs, and the plurality of computers included in the computer cluster may perform parallel processing.

Figure 8:
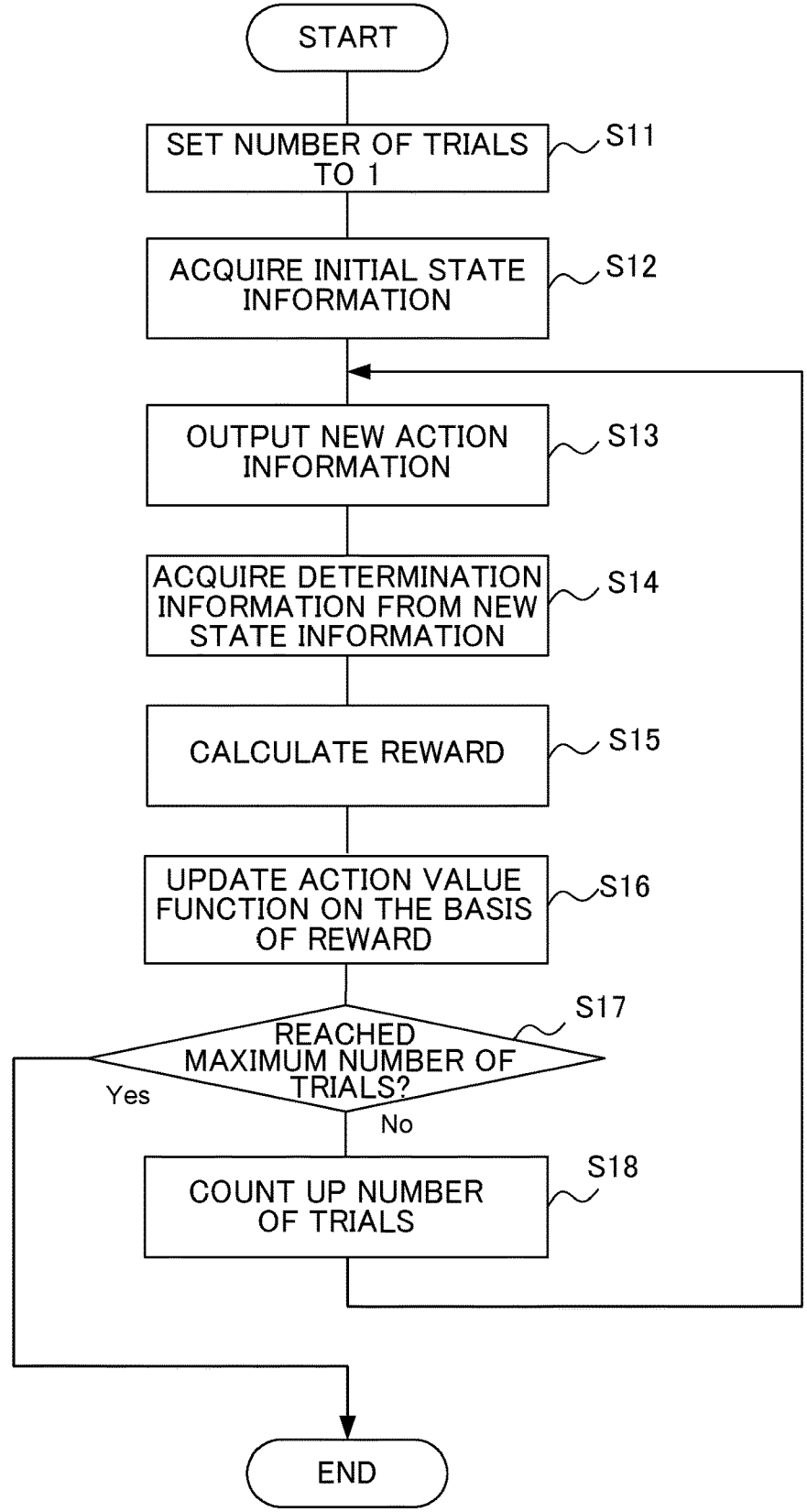
FIG. 8 is a flowchart for describing an operation of the machine learning device.
Figure 9:
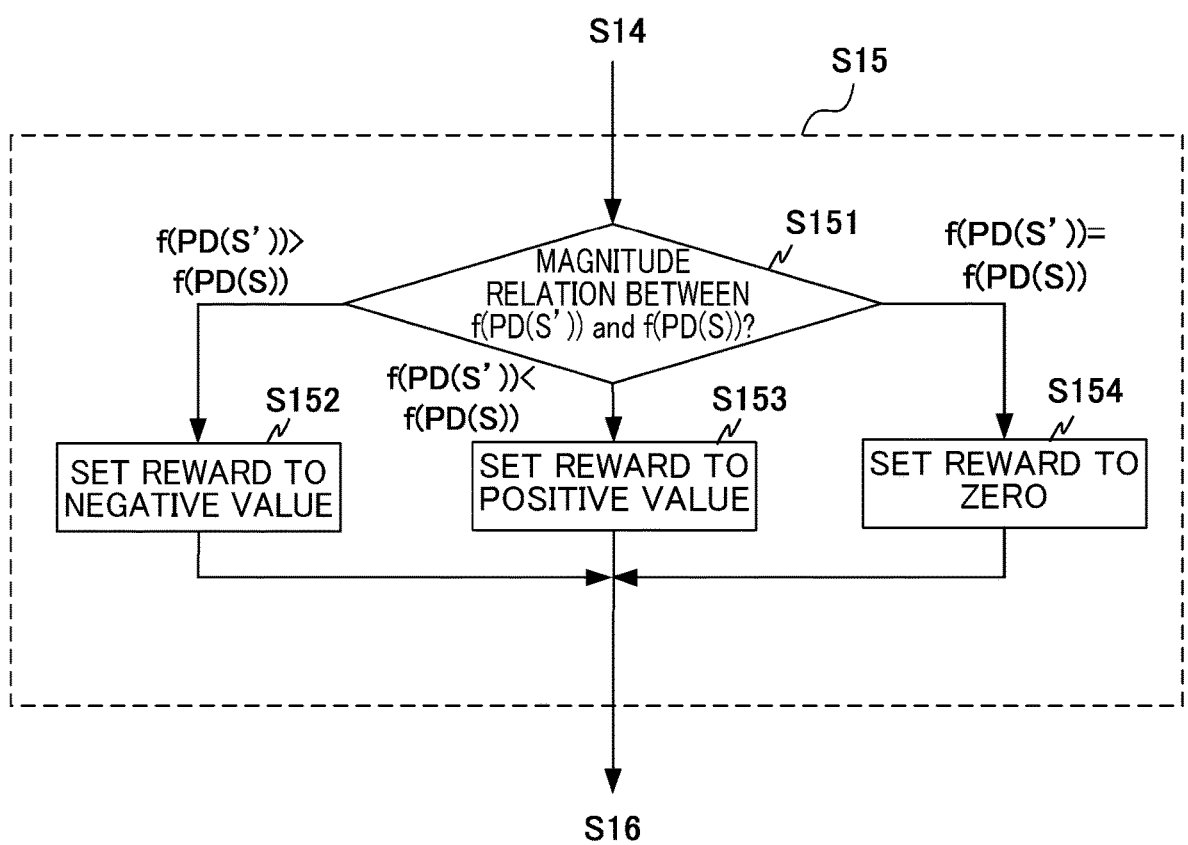
FIG. 9 is a diagram illustrating the details of step S15 of the flowchart of FIG. 8.

Next, an operation of the machine learning device 300 during Q-learning according to the present embodiment will be described with reference to the flowcharts of FIGS. 8 and 9. FIG. 9 is a diagram illustrating the details of step S15 in the flowchart of FIG. 8.

In step S11, the learning unit 302 sets the number of trials to 1. Subsequently, in step S12, the state information acquisition unit 301 acquires the state information S from the servo motor controller 200. The acquired state information is output to the value function updating unit 3022 and the action information generation unit 3023. As described above, the state information S is information corresponding to the state in Q-learning, and includes the compensation coefficient c of the position gain Kp of the position control unit 2041, the compensation coefficient e of the filter coefficient F of the filter 2044, and the compensation coefficient g of the torque offset value of the compensation unit 205 at the time point of step S12. In this way, the positional error set PD(S) corresponding to a machining shape is acquired when the compensation coefficient c of the position gain Kp of the position control unit 2041, the compensation coefficient e of the filter coefficient F of the filter 2044, and the compensation coefficient g of the torque offset value of the compensation unit 205 are initial values.

As described above, the compensation coefficient c of the position gain Kp of the position control unit 2041, the compensation coefficient e of the filter coefficient F of the filter 2044, and the compensation coefficient g of the torque offset value of the compensation unit 205 at an initial state $S_0$ are initially set by the user.

The positional error value $PD(S_0)$ at the state $S_0$ is obtained from the subtractor 203 at the time point at which the Q-learning starts initially by operating the servo motor controller 200 according to the evaluation program. The position command creation unit 201 sequentially outputs the position command according to the machining shape designated by the evaluation program. The position command value corresponding to the machining shape is output from the position command creation unit 201, and the subtractor 203 outputs a difference between the position command value and the position detection value to the machine learning device 300 as the positional error $PD(S_0)$.

In step S13, the action information generation unit 3023 generates new action information A and outputs the generated new action information A to the servo motor controller 200 via the action information output unit 303. The action information generation unit 3023 outputs the new action information A on the basis of the above-described policy. The servo motor controller 200 having received the action information A drives a machine tool including the servo motor according to the state S' obtained by correcting the compensation coefficient c of the position gain Kp of the position control unit 2041, the compensation coefficient e of the filter coefficient F of the filter 2044, and the compensation coefficient g of the torque offset value of the compensation unit 205 associated with the present state S on the basis of the received action information. As described above, the action information corresponds to the action A in Q-learning.

In step S14, the state information acquisition unit 301 acquires the positional error PD(S') in the new state S' and the compensation coefficient c of the position gain Kp of the position control unit 2041, the compensation coefficient e of the filter coefficient F of the filter 2044, and the compensation coefficient g of the torque offset value of the compensation unit 205 from the subtractor 203. In this way, the state information acquisition unit 301 acquires the positional error set PD(S') corresponding to the machining shape for the compensation coefficients c, e, and g in the state S' from the control unit 204 and the compensation unit 205. The acquired state information is output to the reward output unit 3021.

In step S151 of step S15, the reward output unit 3021 determines a magnitude relation between the evaluation function value f(PD(S')) of the positional error in the state S' and the evaluation function value f(PD(S)) of the positional error in the state S and sets the reward to a negative value in step S152 when f(PD(S'))>f(PD(S)). When f(PD(S'))<f(PD(S)), the reward output unit 3021 sets the reward to a positive value in step S153. When f(PD(S'))=f(PD(S)), the reward output unit 3021 sets the reward to zero in step S154. The reward output unit 3021 may apply weighting to the negative and positive reward values.

When any one of steps S152, S153, and S154 ends, the value function updating unit 3022 updates the value function Q stored in the value function storage unit 304 on the basis of the value of the reward calculated in any one of the steps in step S16. In step S17, the learning unit 302 determines whether the number of trials has reached a largest number of trials. When the number of trials has not reached the largest number of trials (step S17: No), the number of trials is counted up in step S18 and the flow returns to step S13 again. After that, the above-described process is repeated, whereby the value function Q converges to an appropriate value. When the number of trials has reached the largest number of trials (step S17: Yes), the learning unit 302 ends the process. The process may end on condition that the above-described process is repeated for a predetermined period. Although online updating is exemplified in step S16, batch updating or mini-batch updating may be performed instead of the online updating.

In the present embodiment, due to the operation described with reference to FIGS. 8 and 9, by using the machine learning device 300, it is possible to obtain an appropriate value function for adjustment of the compensation coefficient c of the position gain Kp of the position control unit 2041, the compensation coefficient e of the filter coefficient F of the filter 2044, and the compensation coefficient g of the torque offset value of the compensation unit 205 and to simplify optimization of the gain and the filter coefficient of the control unit 204 and the torque offset value of the compensation unit 205.

Figure 10:
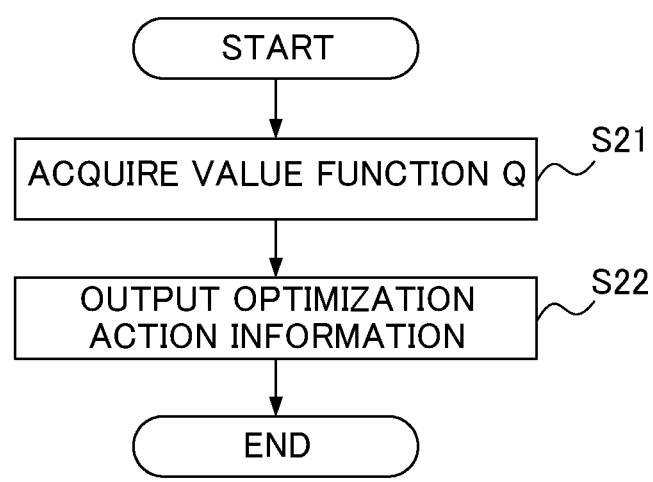
FIG. 10 is a flowchart for describing an operation of an optimization action information output unit of the machine learning device according to the first embodiment.

Next, an operation during generation of the optimization action information by the optimization action information output unit 305 will be described with reference to the flowchart of FIG. 10. First, in step S21, the optimization action information output unit 305 acquires the value function Q stored in the value function storage unit 304. As described above, the value function Q is updated by the value function updating unit 3022 performing the Q-learning.

In step S22, the optimization action information output unit 305 generates the optimization action information on the basis of the value function Q and outputs the generated optimization action information to the changing unit 206 of the servo motor controller 200. The changing unit 206 optimizes the compensation coefficient c of the position gain Kp of the position control unit 2041, the compensation coefficient e of the filter coefficient F of the filter 2044, and the compensation coefficient g of the torque offset value of the compensation unit 205.

In the present embodiment, due to the operation described with reference to FIG. 10, the optimization action information is generated on the basis of the value function Q obtained by the machine learning device 300 performing learning, and the servo motor controller 200 can simplify the adjustment of the compensation coefficient c of the position gain Kp of the position control unit 2041, the compensation coefficient e of the filter coefficient F of the filter 2044, and the compensation coefficient g of the torque offset value of the compensation unit 205 presently set on the basis of the optimization action information and reduce the positional error value.

Second Embodiment

Although the first embodiment relates to a servo motor control system when the load of a control target varies depending on a rotation angle, the present embodiment relates to a servo motor control system in which the control target 110 is a planer machine tool and the load varies depending on a position. In the servo motor control system of the present embodiment, two servo motor controllers are provided in the X-direction, one servo motor controller is provided in the Y-direction, and two servo motor controllers are provided in the Z-direction so that a door including a spindle head moves in the X, Y, and Z directions in relation to a work. A basic configuration and operations of the servo motor control system, the servo motor controller, and the machine learning device excluding the control target are similar to the configuration and the operations described with reference to FIGS. 1 to 10. In the following description, a control target and a servo controller associated with the control target will be described.

Figure 11:
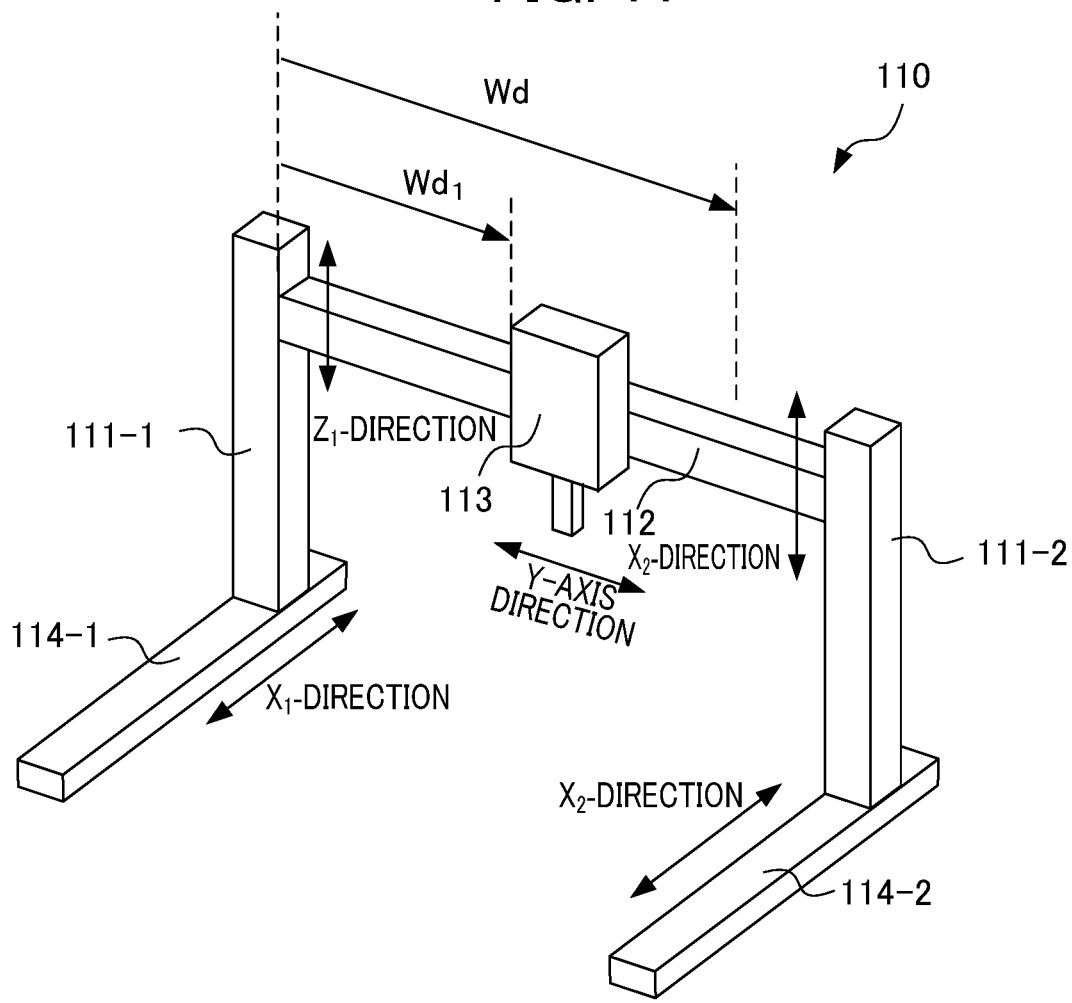
FIG. 11 is a schematic diagram illustrating a planer machine serving as a control target of a servo motor control system according to a second embodiment of the present invention.

FIG. 11 is a schematic diagram illustrating a configuration of a planer machine. The planer machine illustrated in FIG. 11 includes supports 111-1 and 111-2 provided in a vertical direction, a support 112 provided in a horizontal direction between the supports 111-1 and 111-2, and beds 114-1 and 114-2 on which the supports 111-1 and 111-2 are disposed.

The spindle head 113 moves in the Y-direction in relation to the support 112 with the aid of a Y-axis servo motor. One end (the left end in FIG. 11) of the support 112 moves up and down in a $Z_1$-direction in relation to the support 111-1 with the aid of a first Z-axis servo motor. The other end (the right end in FIG. 11) of the support 112 moves up and down in a $Z_2$-direction in relation to the support 111-2 with the aid of a second Z-axis servo motor. The first and second Z-axis servo motors move in an interlocked manner whereby the support 112 moves up and down.

The support 111-1 moves in an $X_1$-direction in relation to the bed 114-1 with the aid of a first X-axis servo motor. The support 111-2 moves in an $X_2$-direction in relation to the bed 114-2 with the aid of a second X-axis servo motor. The first and second X-axis servo motors move in an interlocked manner whereby the door formed by the supports 111-1 and 111-2 and the support 112 moves.

When the spindle head 113 moves in the Y-axis direction in relation to the support 112, the load (the load applied to both ends of the support 112 and the load applied to the supports 111-1 and 111-2) applied to both sides of the door changes depending on the position of the spindle head 113. Therefore, when the spindle head 113 moves in the Y-axis direction in relation to the support 112, the machine learning device learns the compensation coefficients (parameters) of the control unit and the compensation unit of the servo motor controller that controls the first and second X-axis servo motors to adjust the compensation coefficients. Moreover, the machine learning device learns the compensation coefficients of the control unit and the compensation unit of the servo motor controller that controls the first and second Z-axis servo motors to adjust the compensation coefficients.

(Servo Motor Controller and Machine Learning Device that Control First and Second Z-Axis Servo Motors)

When the spindle head 113 moves in the Y-axis direction in relation to the support 112, since the load applied to both ends of the support 112 changes, the torque of the first and second Z-axis servo motors that move the support 112 in the vertical direction of the door changes according to a variation in the load. Therefore, the servo motor controller that controls the first and second Z-axis servo motors need to change the torque offset. For example, as illustrated in FIG. 11, it is assumed that the spindle head can move by a distance of Wd from one end (the end close to the support 111-1) of the support 112 to the other end (the end close to the support 111-2), and the spindle head 113 has moved by a distance of Wd1 from one end (the end close to the support 111-1) of the support 112. In this case, the load of the first Z-axis servo motor that moves one end (the end close to the support 111-1) of the support 112 in the $Z_1$-direction becomes lighter, and the torque offset value can be expressed as h2−g2×Wd1 when the compensation coefficient (parameter) is g2. Here, h2 indicates the torque offset value when Wd1=0. On the other hand, the load of the second Z-axis servo motor that moves the other end (the end close to the support 111-2) of the support 112 in the $Z_2$-direction becomes heavier, and the torque offset value can be expressed as h3+g2×Wd1. Here, h3 indicates the torque offset value when Wd1=0. The changing unit 206 changes the compensation coefficient g2 on the basis of the action information or the optimization action information from the machine learning device 300.

When the spindle head 113 moves in the Y-axis direction in relation to the support 112, and the load applied to both ends of the support 112 changes, since the driving force of the servo motor changes, the position gain Kp of the position control unit 2041 needs to be decreased when the load is light and the position gain Kp of the position control unit 2041 needs to be increased when the load is heavy.

For example, as illustrated in FIG. 11, the spindle head can move by a distance of Wd from one end (the end close to the support 111-1) of the support 112 to the other end (the end close to the support 111-2), and the spindle head 113 moves by a distance of Wd1 from one end (the end close to the support 111-1) of the support 112. In this case, for example, the load of the controller of the first Z-axis servo motor that moves one end (the end close to the support 111-1) of the support 112 in the $Z_1$-direction becomes lighter, and the position gain Kp of the position control unit 2041 can be expressed as Kp=b2−c2×Wd1 when the compensation coefficient (parameter) is c2, a gain variation due to movement of the distance of Wd1, and the fixed value is b2. Here, b2 indicates the position gain when Wd1=0. On the other hand, the load of the controller of the second Z-axis servo motor that moves the other end (the end close to the support 111-2) of the support 112 in the $Z_2$-direction becomes heavier, and the position gain Kp of the position control unit 2041 can be expressed as Kp=b2+c2×Wd1 when the compensation coefficient (parameter) is c2, a gain variation due to movement of the distance of Wd1 is c2×Wd1, and the fixed value is b3. Here, b3 indicates the position gain when Wd1=0. The changing unit 206 changes the compensation coefficient c2 of the position gain Kp on the basis of the action information or the optimization action information from the machine learning device 300.

The servo motor controller that controls the first and second Z-axis servo motors has high-frequency resonance characteristics when the load is light and has low-frequency resonance characteristics when the load is heavy. Therefore, the servo motor controller that controls the first and second Z-axis servo motors needs to adjust the filter coefficient of the filter 2044 so that high-frequency signals are attenuated when the load is light and low-frequency signals are attenuated when the load is heavy.

For example, as illustrated in FIG. 11, it is assumed that the spindle head can move by a distance of Wd from one end (the end close to the support 111-1) of the support 112 to the other end (the end close to the support 111-2), and the spindle head 113 has moved by a distance of Wd1 from one end (the end close to the support 111-1) of the support 112. In this case, the load of the first Z-axis servo motor that moves one end (the end close to the support 111-1) of the support 112 in the $Z_1$-direction becomes lighter, and the filter coefficient F can be expressed as F=d2+e2×f(Wd1) when the fixed value is d2, the compensation coefficient (parameter) is e2, and a function depending on the distance Wd1 is f(Wd1). The function f(Wd1) is a function that is appropriately determined according to a circuit configuration of the filter 2044. Here, d2 indicates the filter coefficient when Wd1=0. On the other hand, the load of the second Z-axis servo motor that moves the other end (the end close to the support 111-2) of the support 112 in the $Z_2$-direction becomes heavier, and the filter coefficient F can be expressed as F=d3−e2×f(Wd1) when the fixed value is d3, the compensation coefficient (parameter) is e2, and a function depending on the distance Wd1 is f(Wd1). Here, d3 indicates the filter coefficient when Wd1=0. The changing unit 206 changes the compensation coefficient e2 on the basis of the action information or the optimization action information from the machine learning device 300.

The machine learning device connected to the servo motor controller that controls the first and second Z-axis servo motors receives the position command of the servo motor controller that controls the Y-axis servo motor as state information in addition to the state information from the servo motor controller that controls the Z-axis servo motor. The position command corresponds to the position of the spindle head 113, and the machine learning device learns the compensation coefficients c2 and e2 of the control unit 204 and the compensation coefficient g2 of the compensation unit 205 of the servo motor controller that controls the Z-axis servo motor by taking the position of the spindle head 113 into consideration and optimizes the compensation coefficients c2 and e2 of the control unit 204 and the compensation coefficient g2 of the compensation unit 205.

(Servo Motor Controller and Machine Learning Device that Control First and Second X-Axis Servo Motors)

When the spindle head 113 moves in the Y-axis direction in relation to the support 112, since the load applied to the supports 111-1 and 111-2 changes, the frictional force when the supports 111-1 and 11-2 are moved in the $X_1$ and $X_2$ directions in relation to the beds 114-1 and 114-2, respectively, changes. Therefore, the servo motor controller that controls the first and second X-axis servo motors need to change the friction compensation value for torque.

Since the driving force of the servo motor changes when the load applied to the supports 111-1 and 111-2 changes, the servo motor controller that controls the first and second X-axis servo motors needs to decrease the position gain Kp of the position control unit 2041 when the load is light and increase the position gain Kp of the position control unit 2041 when the load is heavy.

The servo motor controller that controls the first and second X-axis servo motors has high-frequency resonance characteristics when the load is light and has low-frequency resonance characteristics when the load is heavy. Therefore, the servo motor controller that controls the first and second X-axis servo motors needs to adjust the filter coefficient of the filter 2044 so that high-frequency signals are attenuated when the load is light and low-frequency signals are attenuated when the load is heavy.

Since the description of how to change the position gain Kp of the position control unit 2041 and the filter coefficient of the filter 2044 of the servo motor controller that controls the first and second X-axis servo motors is similar to the description of how to change the position gain Kp of the position control unit 2041 and the filter coefficient of the filter 2044 of the servo motor controller that controls the first and second Z-axis servo motors, the description thereof will be omitted.

In the servo motor controller that controls the first and second X-axis servo motors, the compensation unit 205 outputs the friction compensation value to the adder 2046 and outputs a compensation coefficient to be described later for calculating the friction compensation value to the machine learning device 300. The machine learning device 300 outputs an adjustment value of the compensation coefficient of the friction compensation value to the changing unit 206 as action information.

For example, as illustrated in FIG. 11, it is assumed that the spindle head can move by a distance of Wd from one end (the end close to the support 111-1) of the support 112 to the other end (the end close to the support 111-2), and the spindle head 113 has moved by a distance of Wd1 from one end (the end close to the support 111-1) of the support 112. In this case, the load of the first X-axis servo motor that moves the support 111-1 in the $X_1$-direction becomes lighter, and the friction compensation value can be expressed as k1−j×Wd1 when the compensation coefficient (parameter) is j. Here, k1 indicates the friction compensation value when Wd1=0. On the other hand, the load of the second X-axis servo motor that moves the support 111-2 in the $X_2$-direction becomes heavier, and the friction compensation value can be expressed as k2+j×Wd1 when the compensation coefficient (parameter) is j. Here, k2 indicates the friction compensation value when Wd1=0. The changing unit 206 changes the compensation coefficient j on the basis of the action information or the optimization action information from the machine learning device 300.

The machine learning device connected to the servo motor controller that controls the first and second X-axis servo motors receives the position command of the servo motor controller that controls the Y-axis servo motor as state information in addition to the state information from the servo motor controller that controls the X-axis servo motor. The position command corresponds to the position of the spindle head 113, and the machine learning device learns the compensation coefficients c2' and e2' of the control unit 204 and the compensation coefficient j of the compensation unit 205 of the servo motor controller that controls the X-axis servo motor by taking the position of the spindle head 113 into consideration and optimizes the compensation coefficients c2' and e2' of the control unit 204 and the compensation coefficient j of the compensation unit 205. The compensation coefficients c2' and e2' indicate the compensation coefficient of the position gain Kp and the compensation coefficient of the filter coefficient F of the servo motor controller that controls the first and second X-axis servo motors.

Third Embodiment

Although the first embodiment relates to a servo motor control system when the load of a control target varies depending on a rotation angle, the present embodiment relates to a servo motor control system in which the control target includes a ball screw. A basic configuration and operations of the servo motor control system, the servo motor controller, and the machine learning device excluding the control target are similar to the configuration and the operations described with reference to FIGS. 1 to 10. In the following description, a control target and a servo controller associated with the control target will be described.

FIG. 12 is a block diagram illustrating a machine tool including a servo motor, serving as an example of the control target 120. The control target 120 includes the servo motor 101, a coupling 121 that connects the servo motor 101 and a ball screw 123, a support unit 122, the ball screw 123, a nut 124 threaded to the ball screw 123, and a support unit 126. The servo motor 101 moves a table 125 with the aid of the coupling 121, the ball screw 123, and the nut 124 to machine a work mounted on the table 125. With rotation of the servo motor 101, the nut 124 threaded to the ball screw 123 moves in the axial direction of the ball screw 123.

Although friction occurs in the control target 120 such as the coupling 121, the support units 122 and 126, the ball screw 123, and the nut 124, friction also occurs in the servo motor 101. Friction may strengthen in a portion of the ball screw due to breaking of a portion of a linear shaft or shortage of grease. As illustrated in FIG. 12, friction may strengthen in a portion of the ball screw 123 due to breaking of a portion of a linear shaft or shortage of grease, and load may be applied to the servo motor 101 in a region in which friction strengthens. The region in which friction strengthens is a region ($Hd_1$<Hd<$Hd_2$) in which a distance Hd is between distance $Hd_1$ and distance $Hd_2$ when the distance from the support unit 122 is Hd. In this region, since the load applied to the servo motor 101 changes, the servo motor controller needs to change the friction compensation value for the torque. The friction compensation value f(ω) when a region in which a load changes is included has a relation indicated by Expression 2 (Math. 2)

Friction has non-linear characteristics and is referred to as non-linear friction. As illustrated in Expression 2, a non-linear friction compensation value f(ω) includes a term $f_1(\omega)$ including a friction compensation value m×ω proportional to a motor velocity ω and a friction compensation value e of the region in which friction strengthens and a friction compensation value $f_2(\omega)$ during stopping. As illustrated in FIG. 12, friction strengthens in the region in which the distance is between the distance $Hd_1$ and the distance $Hd_1$, and the friction compensation value e (e>0) is given in this region.

$$f_{(\omega)} = f_{1(\omega)} + f_{2(\omega)} \qquad \text{[Math. 2]}$$

$$f_{1(\omega)} = m \times \omega + e$$

$$f_{2(\omega)} = \begin{cases} n(\omega > 0) \\ 0(\omega = 0) \\ -n(\omega < 0) \end{cases}$$

The changing unit 206 changes the friction compensation value e in the region in which the distance Hd is between the distance $Hd_1$ and the distance $Hd_2$ on the basis of the action information or the optimization action information from the machine learning device 300.

The machine learning device learns the compensation value q of the position gain Kp of the position control unit 2041 of the control unit 204 of the servo motor controller, the compensation coefficient s of the filter coefficient F of the filter 2044 of the control unit 204, and the friction compensation value e of the compensation unit 205 by taking the region ($Hd_1$<Hd<$Hd_2$) of the region where friction strengthens into consideration and optimizes the compensation value q of the position gain Kp of the position control unit 2041, the compensation coefficient s of the filter coefficient F of the filter 2044 of the control unit 204, and the friction compensation value e of the compensation unit 205.

In the servo motor controller, the compensation unit 205 outputs the friction compensation value to the adder 2046 and outputs the friction compensation value e(Hd) to the machine learning device 300. The machine learning device 300 outputs an adjustment value of the friction compensation value e(Hd) to the changing unit 206 as action information. The compensation unit 205 outputs a friction compensation value f(ω,Hd) to the adder 2046 as a torque compensation value.

Although the first to third embodiments described above relate to change in the load that depends on the angle or the position of the control target connected to the servo motor (that is, change in spatial load), the present invention can be also applied to change in temporal load. For example, in the control target in the first to third embodiments, the load related to a servo motor may change with time due to abrasion and shortage of grease. In the first to third embodiments, although a largest number of trials is determined, machine learning may be continued without determining the largest number of trials. If the largest number of trials is not determined, since the parameters of the control unit and the compensation unit of the servo motor controller are adjusted according to change in the temporal load, the servo motor controller can be operated with optimal servo performance at that time point even when the load changes with time. Moreover, the machine learning device 300 may perform learning by executing an evaluation program or a machining program used actually in a preparation step to set the parameters of the control unit and the compensation unit of the servo motor controller. After that, the machine learning device 300 may control the control target using the machining program to perform machining or the like repeatedly and perform learning by executing the evaluation program or the machining program used actually in the preparation step periodically or randomly to adjust the parameters of the control unit and the compensation unit of the servo motor controller according to change in the temporal load.

The servo motor control unit of the servo motor controller described above and the components included in the machine learning device may be realized by hardware, software or a combination thereof. The servo motor control method performed by cooperation of the components included in the servo motor controller described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example, a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)).

The above-described embodiment is a preferred embodiment of the present invention. However, the scope of the present invention is not limited to the embodiment only but the present invention can be embodied in various modifications without departing from the spirit of the present invention.

<Modification in which Servo Motor Controller Includes Machine Learning Device>

Although the machine learning device 300 is configured as a device separate from the servo motor controller 200 in the above-described embodiments, some or all of the functions of the machine learning device 300 may be realized by the servo motor controller 200.

<Freedom in System Configuration>

In the embodiment described above, the machine learning device 300 and the servo motor controller 200 are communicably connected as a one-to-one correlation. However, for example, one machine learning device 300 and a plurality of servo motor controllers 200 may be communicably connected via the network 400 and the machine learning of each of the servo motor controllers 200 may be performed. In this case, a distributed processing system may be adopted, in which respective functions of the machine learning device 300 are distributed to a plurality of servers as appropriate. The functions of the machine learning device 300 may be realized by utilizing a virtual server function, or the like, in a cloud. When there are a plurality of machine learning devices 300-1 to 300-$n$ corresponding to a plurality of servo motor controllers 200-1 to 200-$n$, respectively, of the same type name, the same specification, or the same series, the machine learning devices 300-1 to 300-$n$ may be configured to share learning results in the machine learning devices 300-1 to 300-$n$. By doing so, more optimal model can be constructed.

EXPLANATION OF REFERENCE NUMERALS

10: Servo motor control system
100, 100-1 to 100-$n$, 110, 120: Control target
101: Servo motor
200, 200-1 to 200-$n$: Servo motor controller
201: Position command creation unit
202: Adder
203: Subtractor
204: Control unit
300, 300-1 to 300-$n$: Machine learning device
301: State information acquisition unit
302: Learning unit
303: Action information output unit
304: Value function storage unit
305: Optimization action information output unit
400: Network

What is claimed is:

1. A servo motor control system comprising a servo motor controller including a changing unit configured to change a parameter of a control unit configured to control a servo motor on a basis of a position command and a compensation value of at least one of the position command and a torque command, a control target controlled by the servo motor controller, and a machine learning device that performs machine learning with respect to the servo motor controller,
wherein the machine learning device includes:
a state information acquisition unit configured to acquire, from the servo motor controller, state information including the position command, a servo state including at least a positional error, a combination of the parameter of the control unit and the compensation value by causing the servo motor controller to execute a predetermined program;
an action information output unit configured to output action information including adjustment information of the combination of the parameter and the compensation value which are included in the state information, to the servo motor controller;
a reward output unit configured to output a value of a reward of reinforcement learning based on the positional error included in the state information; and
a value function updating unit configured to update a value function on a basis of the value of the reward output by the reward output unit, the state information, and the action information,
wherein the control unit of the servo motor controller includes: a position control unit configured to generate a velocity command on a basis of the position command; a velocity control unit configured to generate the torque command on a basis of the velocity command output from the position control unit; and a filter configured to attenuate signals of frequencies in a predetermined frequency range of the torque command output from the velocity control unit, and the changing unit of the servo motor controller changes a gain of at least one of the position control unit and the velocity control unit, a filter coefficient of the filter, and at least one of a torque offset value and a friction compensation value applied to the position command or the torque command, on a basis of the action information.

2. The servo motor control system according to claim 1, wherein the reward output unit outputs the value of the reward on the basis of an absolute value of the positional error.

3. The servo motor control system according to claim 1, further comprising:

an optimization action information output unit configured to generate a combination of the parameter of the control unit and the compensation value of at least one of the position command and the torque command on a basis of the value function updated by the value function updating unit, and configured to output the combination to the changing unit.

4. The servo motor control system according to claim 1, wherein the control target includes a servo motor and a driver of which the rotation angle is controlled by the servo motor, and a load that a rotation shaft of the driver receives varies depending on the rotation angle.

5. The servo motor control system according to claim 4, wherein the load changes with time.

6. The servo motor control system according to claim 1, wherein the control target includes a servo motor and a driver of which the position is controlled by the servo motor, and a load that the control target receives varies depending on the position.

7. The servo motor control system according to claim 6, wherein the load changes with time.

8. A control method of a servo motor control system comprising a servo motor controller including a changing unit configured to change a parameter of a control unit configured to control a servo motor on the basis of a position command and a compensation value of at least one of the position command and a torque command, a control target controlled by the servo motor controller, and a machine learning device that performs machine learning with respect to the servo motor controller, wherein the machine learning method comprises steps executed by the machine learning device of:

acquiring, from the servo motor controller, state information including the position command, a servo state including at least a positional error, a combination of the parameter of the control unit and the compensation value by causing the servo motor controller to execute a predetermined program;

outputting, to the servo motor controller, action information including adjustment information of the combination of the parameter and the compensation value which are included in the state information; and updating an action value function on a basis of a value of a reward of reinforcement learning, the state information, and the action information based on the positional error included in the state information, wherein the control unit of the servo motor controller includes: a position control unit configured to generate a velocity command on a basis of the position command; a velocity control unit configured to generate the torque command on a basis of the velocity command output from the position control unit; and a filter configured to attenuate signals of frequencies in a predetermined frequency range of the torque command output from the velocity control unit, and the changing unit of the servo motor controller changes a gain of at least one of the position control unit and the velocity control unit, a filter coefficient of the filter, and at least one of a torque offset value and a friction compensation value applied to the position command or the torque command, on a basis of the action information.

* * * * *